United States Patent [19]

Gupta et al.

[11] Patent Number: 5,235,644
[45] Date of Patent: Aug. 10, 1993

[54] PROBABILISTIC CRYPTOGRAPHIC PROCESSING METHOD

[75] Inventors: Amar Gupta, Northboro; Butler W. Lampson, Cambridge; William R. Hawe, Pepperell; Joseph J. Tardo, Acton; Charles W. Kaufman, Northboro; Mark F. Kempf, Stow; Morrie Gasser, Saugus; B. J. Herbison, Leominster, all of Mass.

[73] Assignee: Digital Equipment Corporation, Maynard, Mass.

[21] Appl. No.: 546,614

[22] Filed: Jun. 29, 1990

[51] Int. Cl.[5] .............................................. H04L 9/00
[52] U.S. Cl. ......................................... 380/48; 380/49
[58] Field of Search .................................. 380/48, 49

[56] References Cited

U.S. PATENT DOCUMENTS 4,882,751 11/1989 Kotzin et al. ............................ 380/49
4,905,277 2/1990 Nakamura ............................... 380/49
4,933,969 6/1990 Marshall ................................. 380/49

Primary Examiner—David Cain
Attorney, Agent, or Firm—A. Sidney Johnston; Ronald E. Myrick; Barry N. Young

[57] ABSTRACT

A decryption method, and associated cryptographic processor, for performing in-line decryption of information frames received from a communication network through a first in-line processing stage. As an information packet is streamed into the cryptographic processor, a determination is made to an acceptable level of probability whether the packet contains data that should be decrypted. The decision whether or not decrypt is made by analyzing the incoming packet header, recognizing a limited number of packet formats, and further parsing the packet to locate any encrypted data and to make sure that the packet is not a segment of a larger message. Falsely decrypted packets are looped back through the cryptographic processor, to regenerate the data that was falsely decrypted. Decryption and encryption are performed in such a manner that a false decryption is completely reversible without loss of data. Special treatment is provided for packets containing data that cannot be divided into an integral number of standard blocks required for decryption processing.

20 Claims, 14 Drawing Sheets

FIG. 9a SNAP/SAP PACKET FORMAT

FIG. 9B SNAP/SAP PACKET FORMAT

FIG. 10 ISO END-TO-END PACKET FORMAT

PROBABILISTIC CRYPTOGRAPHIC PROCESSING METHOD

BACKGROUND OF THE INVENTION

This invention relates generally to computer networks and, more specifically, to techniques for encrypting and decrypting messages transmitted over networks. The following background material, under the subheadings "Computer Network Background" and "Cryptography Background," introduces various computer network and cryptography concepts and definitions. Those familiar with computer networks and cryptography may wish to skip these two sections.

Computer Network Background

A computer network is simply a collection of autonomous computers connected together to permit sharing of hardware and software resources, and to increase overall reliability. The term "local area network" (LAN) is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

As computer networks have developed, various approaches have been used in the choice of communication medium, network topology, message format, protocols for channel access, and so forth. Some of these approaches have emerged as de facto standards. Several models for network architectures have been proposed and widely accepted. The most widely accepted model is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel, and making sure that the data bits are received without error. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link to the next layer above, known as the network layer. This channel may lose whole packets, but will not otherwise corrupt data. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control (LLC) sublayer, which performs all medium-independent functions of the data link layer, and a media access control (MAC) sublayer. The MAC sublayer determines which station should get access to the communication channel when there are conflicting requests for access. The functions of the MAC sublayer are more likely to be dependent on the nature of the transmission medium.

Bridges may be designed to operate in the MAC sublayer. Further details may be found in "MAC Bridges," P802.1D/D6, September 1988 (and later versions), a draft publication of IEEE Project 802 on Local and Metropolitan Area Network Standards.

The basic function of a bridge is to listen "promiscuously," i.e. to all message traffic on all LANs to which it is connected, and to forward some of the messages it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater and forwards messages from one LAN to another until they reach their destinations. Other devices, known as routers, are also used to interconnect LANs.

A router, like a bridge, is a device connected to two or more LANs. Unlike a bridge, however, a router operates at the network layer level, instead of the data link layer level. Addressing at the network layer level makes use of a large (e.g. 20-byte) address field for each host computer, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When cryptography is used to protect data transmitted over a computer network, some network devices, such as bridges and routers, may require special treatment. For example, an encrypted message should, in general, not be decrypted by a router that is merely forwarding the message to an adjacent LAN. As will also become apparent as this description proceeds, cryptography as applied to networks poses some problems that do not arise in a more conventional application of cryptography in point-to-point communication. When a message passes down through the various protocol layers of a transmitting station, each layer adds its own header to the message, which may be segmented into standard-size frames of data. The headers added at various protocol levels include addressing and other information that is used to route a message frame to its intended destination and to recreate the message at the destination. Encryption must usually be applied only to the message content and not to the various message headers. While this is not a difficult concept, in practice complexities arise because different network protocols may be employed at any of the protocol levels. Therefore, a hardware-implemented cryptographic system for networks must be capable of handling message frames originating from these different protocols, and having necessarily different frame formats. In addition each of these frames may get segmented into smaller frames as it passes through several intermediate network links.

Cryptography Background

The principal goal of encryption is to render communicated data secure from unauthorized eavesdropping. This is generally referred to as the "secrecy" or "confidentiality" requirement of cryptographic systems. A related requirement is the "authenticity" or "integrity" requirement, which ensures that the communicated information is authentic, i.e. that it has not been tampered with, either deliberately or inadvertently. For purposes of further discussion, some definitions are needed.

"Plaintext" is used to refer to a message before encrypting and after decrypting by a cryptographic system. "Ciphertext" is the form that the encrypted part of the message takes during transmission over a communications channel. "Encryption" or "encipherment" is the process of transformation from plaintext to ciphertext. "Decryption" or "decipherment" is the process of transformation from ciphertext to plaintext. Both encryption and decryption are controlled by a "cipher key," or keys. Without knowledge of the encryption key, a message cannot be encrypted, even with knowledge of the encrypting process. Similarly, without knowledge of the decryption key, the message cannot be decrypted, even with knowledge of the decrypting process.

More specifically, a cryptographic system can be thought of as having an enciphering transformation $E_k$, which is defined by an enciphering algorithm E that is used in all enciphering operations, and a key K that distinguishes $E_k$ from other operations using the algorithm E. The transformation $E_k$ encrypts a plaintext message M into an encrypted message, or ciphertext C. Similarly, the decryption is performed by a transformation $D_k$ defined by a decryption algorithm D and a key K.

Dorothy E. R. Denning, in "Cryptography and Data Security," Addison-Wesley Publishing Co. 1983, suggests that, for complete secrecy of the transmitted message, two requirements have to be met. The first is that it should be computationally infeasible for anyone to systematically determine the deciphering transformation $D_k$ from intercepted ciphertext C, even if the corresponding plaintext M is known. The second is that it should be computationally infeasible to systematically determine plaintext M from intercepted ciphertext C. The authenticity requirement is satisfied if no-one can substitute false ciphertext C' for ciphertext C without detection.

By way of further background, cryptographic systems may be classified as either "symmetric" or "asymmetric." In symmetric systems, the enciphering and deciphering keys are either the same or are easily determined from each other. When two parties wish to communicate through a symmetric cryptographic system, they must first agree on a key, and the key must be transferred from one party to the other by some secure means. This usually requires that keys be agreed upon in advance, perhaps to be changed on an agreed timetable, and transmitted by courier or some other secure method. Once the keys are known to the parties, the exchange of messages can proceed through the cryptographic system.

An asymmetric cryptosystem is one in which the enciphering and deciphering keys differ in such a way that at least one key is computationally infeasible to determine from the other. Thus, one of the transformations $E_k$ or $D_k$ can be revealed without endangering the other.

In the mid-1970s, the concept of a "public key" encryption system was introduced. In a public key system, each user has a public key and private key, and two users can communicate knowing only each other's public keys. This permits the establishment of a secured communication channel between two users without having to exchange "secret" keys before the communication can begin.

In general, asymmetric cryptographic systems require more computational "energy" for encryption and decryption than symmetric systems. Therefore, a common development has been a hybrid system in which an asymmetric system, such as a public key system, is first used to establish a "session key" for use between two parties wishing to communicate. Then this common session key is used in a conventional symmetric cryptographic system to transmit messages from one user to the other.

Cryptography in Networks

Although cryptographic principles may be conceptually simple when point-to-point communications are involved, additional problems arise when the communication is over a complex computer network. A single message communicated from one station to another may pass through multiple stations and multiple LANs before reaching its final destination. A basic design question is whether the encryption should be "end-to-end" encryption, i.e. with one encryption process at the source station and one decryption process at the final destination station, or "link" encryption, i.e. with encryption and decryption taking place before and after transmission "hop" over each intermediate communication link through which the message is passed. Various combinations of end-to-end encryption and link encryption are also possible. Standardization in the area of cryptographic processing for networks is still evolving.

One effort directed toward standardization is the Standard for Interoperable LAN Security (SILS), an ongoing effort of an IEEE 802.10 subcommittee aimed at standardizing "datalink layer" encryption for a LAN.

In general, end-to-end encryption is preferred because it provides a higher level of data security and authenticity, since messages are not deciphered until they reach their final destinations. However, any addressing information, or the early parts of the frame that contain network addresses, cannot be encrypted in end-to-end encryption, because intermediate stations or nodes need them for message routing. One of the practical difficulties of using cryptography in computer networks is that a received message packet will contain both plaintext data, such as frame headers added by the various layers of network protocol, and encrypted data, which is usually the largest part of the packet. Another complication is the possible existence of multiple protocols at some levels. Ideally, a network cryptography system must be capable of handling these different protocols without modification of the hardware or software performing the encrypting or decrypting operations.

A related problem is that the network protocols of the upper layers are subject to occasional revision, by manufacturers or by industry standards committees. Therefore, an ideal network cryptography system is one that is relatively immune to changes in upper layer protocols, specifically the network layer and above.

Still another difficulty is that network architectures without cryptography are already well established. The addition of the cryptographic functions must ideally be made without impact on the continued operation of these existing architectures. In other words, cryptography should be implemented as a simple hardware solution that fits within current architectures with as little change as possible.

In the past, cryptographic processing has been performed in the network environment in a mode that can best be characterized as "store-process-forward." A packet of data to be encrypted or decrypted is stored in a packet buffer, is subsequently retrieved for cryptographic processing, and is ultimately forwarded after processing. In some designs, the packet buffer is multi-ported, to allow incoming data to be stored while other data in the buffer is processed by encryption/decryption software in a host computer system. In other designs, there are two packet buffers, one of which is filled with incoming data while the other is being emptied and cryptographically processed. These requirements for multiple buffers or enlarged packet buffers necessarily introduce cost and performance restrictions on the host processor. In addition there is a necessary delay in the processing of each packet at both the sending and receiving ends.

As used in this specification, the term encryption is intended to encompass cryptographic processing that provides either "confidentiality and integrity" or "integrity only" protection to the data. In the former case, the message and a checksum are encrypted before appending network and MAC headers. In the latter case, the message is in plaintext but a cryptographic checksum is appended to the message. Similarly, the term decryption is used for cryptographic processing encompassing both the recovery of plaintext along with recovery and verification of a checksum from encrypted data, and the verification of the integrity of an "integrity only" protected message.

It will be appreciated from the foregoing that there is a still a need for improvement in cryptographic processing for computer networks. Ideally, cryptographic processing should place no special demands on the packet memory storage at a station, should not introduce any substantial delay or latency in the processing of each packet, and should be convenient to add to existing network architectures that do not have cryptographic processing. The present invention is directed to these ends.

SUMMARY OF THE INVENTION

The present invention resides in a method and related apparatus for decrypting incoming information packets on a probabilistic basis. In terms of a novel method, the invention comprises the steps of examining an incoming information packet as it is received in the form of a serial stream of information from a first in-line processing stage; determining to an acceptable level of probability whether the incoming information packet contains encrypted data and whether it should be decrypted; and, if it is determined that the packet should be decrypted, finding the starting position of encrypted data in the incoming packet, and decrypting the encrypted data. The final step of the method is that of passing the information packet, whether decrypted or not, to a second in-line processing stage.

More specifically, the step of determining whether the incoming packet contains encrypted data includes identifying the packet format from knowledge of a limited number of packet formats that are generated by a corresponding number of network protocols, and, if the packet format is identified, the step of finding the starting position of the encrypted data includes obtaining an offset value indicative of the starting position.

A further step of the method is subsequently determining in or after the second in-line processing stage that an information packet that was decrypted should not have been. Then, in the case of such a false decryption, passing the decrypted packet back from the second in-line processing stage for further cryptographic processing, and re-encrypting the information packet to regenerate data that should not have been subjected to decryption.

The step of decrypting is performed in such a manner that it is completely reversible in the re-encrypting step. Specifically, the last n bytes (usually 4 or 8 bytes) of data in the packet are recovered on decryption by exclusive ORing the last n bytes in the received packet with an n-byte integrity check value (ICV) generated from the preceding data bytes. In the event of a false decryption, the exclusive ORing step results in the generation of false data, but the re-encrypting step includes exclusive ORing the false data with the ICV, to regenerate the real data in the last n bytes of the packet.

In accordance with another aspect of the invention, the step of determining whether the incoming packet contains encrypted data and whether it should be decrypted, includes determining to an acceptable level of probability whether the packet is part of a message that has been segmented into multiple packets, and electing not to decrypt such a message segment. When such a segment is recognized, the method includes passing each message segment on to the second in-line processing stage, without decryption, for further processing; then, in the second or a later in-line processing stage, reforming the message segments into a complete message, and returning the complete message, if encrypted, back from the second in-line processing stage for decryption.

In terms of a cryptographic processor, the invention includes data encryption/decryption means, and first and second interface circuits connected between the data encryption/decryption means and two in-line processing stages in a network architecture. The cryptographic processor may be conveniently inserted between the two in-line processing stages without modification to any existing network protocols. The encryption/decryption means includes means for examining an incoming information packet as it is received in the form of a serial stream of information from the first in-line processing stage, means for determining to an acceptable level of probability whether the incoming information packet contains encrypted data and whether it should be decrypted, means that operate if it is determined that the packet should be decrypted, for finding the starting position of encrypted data in the incoming packet and decrypting the encrypted data, and means for passing the information packet, whether decrypted or not, to the second in-line processing stage.

In accordance with another aspect of the invention, special provision is made for the decryption processing of packets that do not contain an integral number of standard-size blocks of data. Decryption processing typically requires that data be presented in blocks of a fixed number of bytes, such as eight bytes. However, in the case of false decryption of a packet that contains no encrypted data, the data field may not be in compliance with this requirement. A nonstandard block size may also arise as a result of message segmentation. The segmentation process, performed at some point in the network architecture, will not be constrained by the decryption processing requirement for a fixed block size. This aspect of the present invention includes the steps of temporarily storing received data until a fixed-size block has been accumulated for further processing, initiating decryption of the accumulated fixed-size block, and continuing to store incoming data to form subsequent blocks for decryption. However, in the event that there are not enough data remaining in the packet to form a complete fixed-size block, the method includes bypassing decryption of the last incomplete block in the packet.

To complete processing of such a packet having an incomplete last block, the method further comprises re-encrypting all blocks of the received packet except the last, incomplete block, and concatenating the re-encrypted blocks with the incomplete block, to regenerate the packet data in the form in which it was received, before decryption. Still further processing includes determining whether the reformed packet is part of a segmented message and, if so, temporarily storing the reformed packet until all other portions of the segmented message have been received; then concatenating all segments of the segmented message, and finally decrypting the message as a single entity.

It will be appreciated from the foregoing that the present invention represents a significant advance in the field of cryptographic processing in communication networks. In particular, the invention provides for rapid and efficient in-line decryption of incoming information packets. With the probabilistic approach, the incoming packets can be processed at network speeds. Any falsely decrypted packets can be completely regenerated by looping the packets back through the cryptographic processor, but the probability of having to perform loopback operations is kept to a statistically low level.

Other aspects and advantages of the invention will become apparent from the following more detailed description, taken in conjunction with the accompanying drawings.

BRIEF DESCRIPTION OF THE DRAWINGS

FIGS. 9a-9b are diagrams of two types of SNAP/SAP packet formats;

FIG. 10 is a diagram of an ISO end-to-end packet format;

DESCRIPTION OF THE PREFERRED EMBODIMENT

Figure 1A:
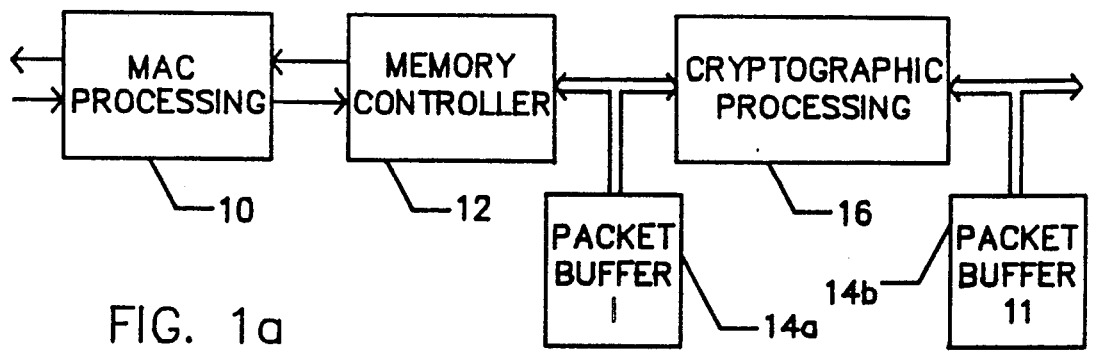
FIGS. 1a-1c are block diagrams of various prior implementations of cryptographic processing in a networking environment.

As shown in the drawings for purposes of illustration, the present invention is concerned with cryptographic processing in the context of interconnected computer networks, referred to in this specification as local area networks or LANs. There are many applications of networks in which confidentiality or the integrity of transmitted data are important to safeguard. Confidentiality ensures that, for all practical purposes, it is impossible for an eavesdropper connected to the network to convert the transmitted data from its encrypted form to its original plaintext form. The "integrity" of the data refers to its protection against unauthorized or inadvertent modification.

In accordance with one of the protocols described in this specification, encryption is performed at a transmitting or source node and decryption is performed at a destination node. This is known as end-to-end encryption, as contrasted with link encryption, in which decryption and re-encryption are performed at each intermediate node between the source and the destination. The manner in which encryption is performed, or the encryption algorithm, is of no particular consequence to the present invention. Nor is it of any consequence whether encryption and decryption keys are exchanged in advance between the sending and receiving nodes, or whether a public key system is used for the establishment of keys. As will be noted later in this description, one implementation of the invention uses an encryption algorithm known as the Data Encryption Standard (DES), as defined by FIPS-46 (Federal Information Processing Standard—46) published by the National Institute of Standards and Technology (formerly the National Bureau of Standards). However, the invention is not limited to this, or any other encryption algorithm.

Typical token ring networks use optical fiber, coaxial cable, or twisted pair cable as a transmission medium. One such network using the token ring protocol is known as the fiber distributed data interface (FDDI). The description in this specification is based on FDDI interfaces and frame formats, but with minor modifications would also apply to a wide variety of network interfaces.

Encryption may be performed, at least in theory, at any of a number of protocol layers in a network architecture. In practice, it is conveniently performed at the data link layer. FIG. 1a is a block diagram showing data flow within the data link layer. Data packets arriving from the physical layer (not shown) are processed by the MAC processor, indicated by reference numeral 10, and then passed to a memory controller 12, which controls operations on two packet buffers 14a, 14b.

In one prior art approach, cryptographic processing is performed, as indicated at 16, on data retrieved from the packet buffers 14a, 14b. For incoming data, from the physical layer, data packets are stored in alternate packet buffers, retrieved for decryption by the cryptographic processor 16, and forwarded in decrypted form to the next higher protocol layer. Outgoing data frames are similarly stored in the packet buffers 14a, 14b, retrieved for encryption by the cryptographic processor 16, and then forwarded by the memory controller 12 to the MAC processor 10.

Figure 1B:
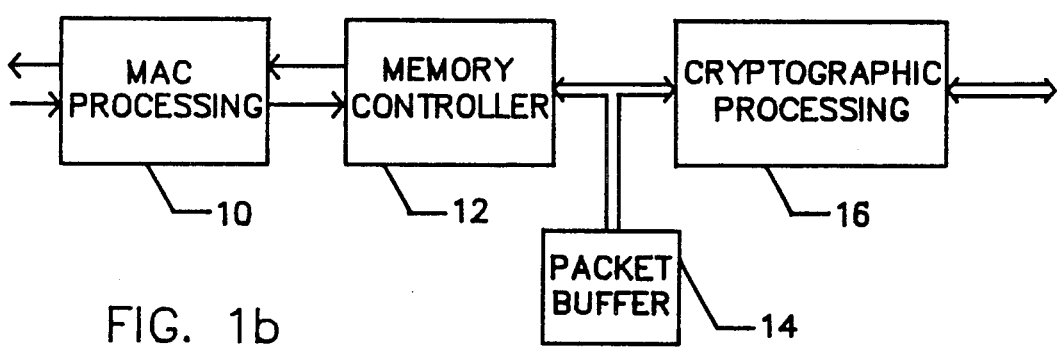
Figure 1C:

FIG. 1b shows a similar arrangement, except that there is only one packet buffer 14, which must be large enough to provide storage for multiple data packets, and may require two ports for simultaneous access to the cryptographic processor 16 and the MAC processor 10. FIG. 1c shows another arrangement, similar to FIG. 1b except that the cryptographic processor 16 is not connected in series with the data paths to higher protocol layers.

Figure 2:
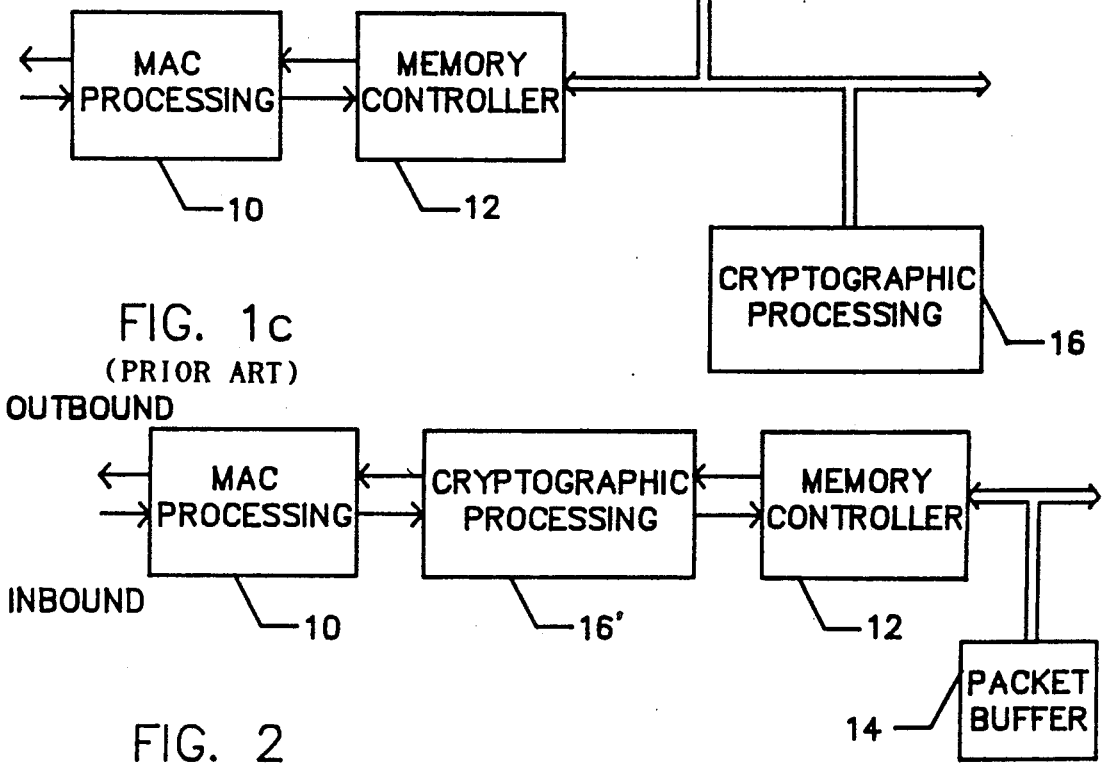
FIG. 2 is a block diagram showing how cryptographic processing is implemented in accordance with one aspect of the present invention.

In accordance with the present invention, and as shown by way of example in FIG. 2, cryptographic processing is performed in an in-line or "pipelined" or "cut-through" fashion by a cryptographic processor 16' which, in this exemplary embodiment, is located between the MAC processor 10 and the memory controller 12. The cryptographic processor operates at network speeds on data streamed from or to the MAC processor 10, and requires no additional packet buffer bandwidth, additional packet buffers, or additional processing capabilities.

Crytographic processor hardware

Figure 3:
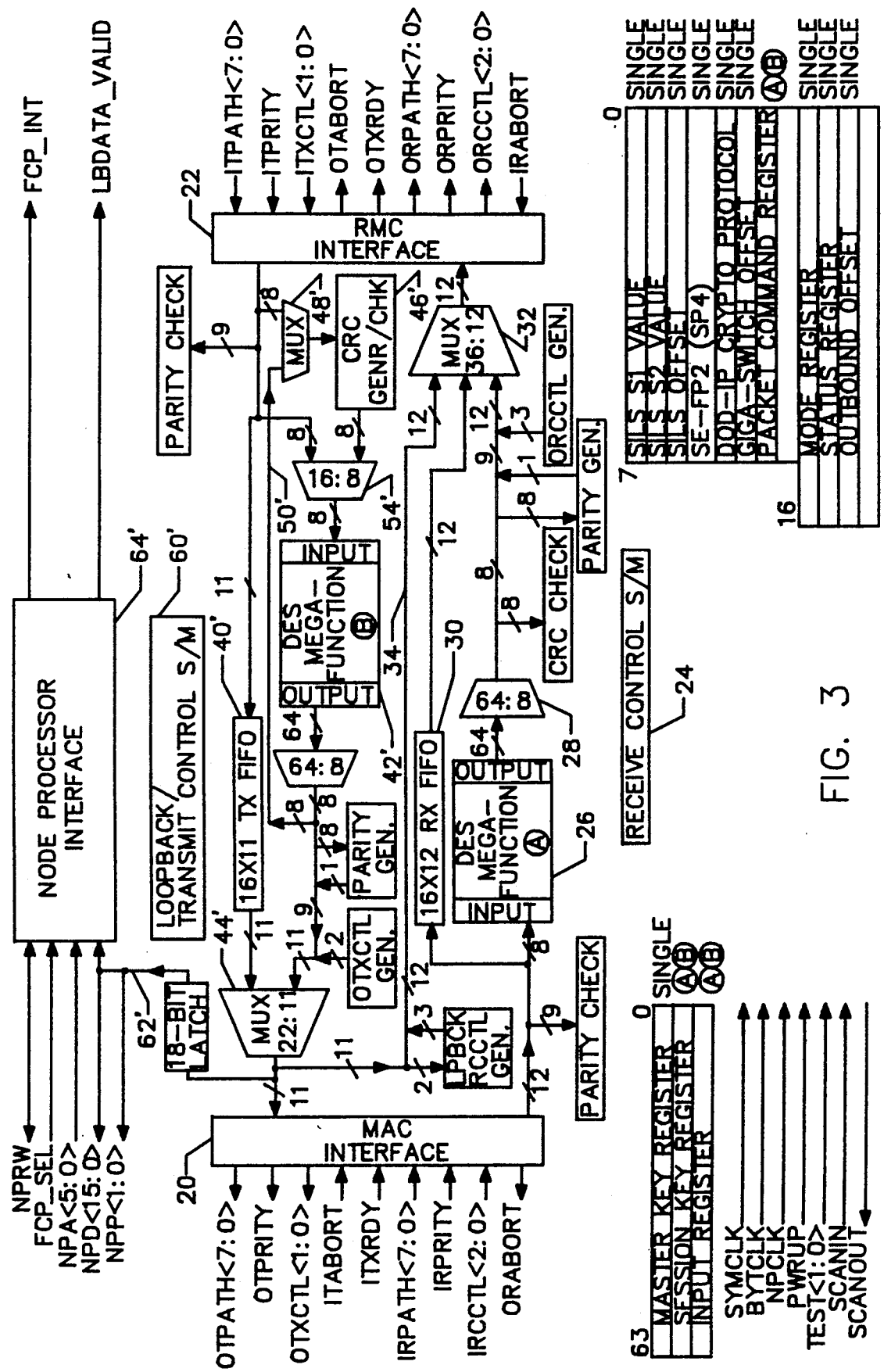
FIG. 3 is block diagram of a cryptographic processor incorporating the claimed invention.

As shown in FIG. 3, the cryptographic processor of the invention provides a full-duplex path between the MAC sublayer, through a MAC interface 20, and the RMC (ring memory controller) module, through an RMC interface 22. The receive data path is normally via input-receive data lines (designated IRPATH) to the MAC interface 20. The MAC interface 20 checks the parity of data received from the MAC processor, monitors control lines for end-of-data signals, to keep track of packets being processed. Processing and routing of the incoming data are controlled largely by a receive control state machine 24, the functions of which will be described in some detail. Basically, the receive control state machine 24 examines incoming packets of data as they arrive from the MAC interface, and determines what action should be taken, including whether or not an incoming packet should be decrypted.

The receive data path also includes a DES (data encryption standard) function module 26 of conventional design, a multiplexer 28 at the output of the DES module 26, a receive FIFO (first-in-first-out) memory 30, and another multiplexer 32, the output of which is connected to the RMC interface. For decryption operations, data signals received from the MAC interface 20 are input to the DES module 26, and the decrypted signals then pass through the multiplexer 32 to the RMC interface 22. The multiplexer 32 selects its input either from the DES module 26, the receive FIFO 30, or from a third line 34 through which data may be looped back to the RMC interface 22 from a transmit data path to be described. Parity, and other check codes to be described, may be added to the decrypted data output from the DES module 26. Data being processed in the receive data path is finally output through the RMC interface 22, over output-receive lines designated ORPATH.

The transmit data path is similar in structure to the receive data path. Data packets for transmission are received at the RMC interface over input-transmit lines designated ITPATH, checked for parity, and transmitted to a transmit FIFO memory 40 and a second DES function module 42, outputs from these two paths being selected by another multiplexer 44 for forwarding to the MAC interface and output over output-transmit lines, designated OTPATH. Insertion of a cyclic redundancy code (CRC) requires the addition of a CRC generator and checker module 46, another multiplexer 48 to select between data from the RMC interface 22 and data fed back over line 50 from the DES module 42 output, and yet another multiplexer 54 to select between output from the CRC generator and input data from the RMC interface. Control of data flow in the transmit data path is effected by a loopback/transmit control state machine 60. It will be observed that multiplexer 44 provides its output to three possible paths: to the MAC interface for transmission of an outbound data packet, to multiplexer 32 (over line 34) for the loopback of a data packet to the RMC interface, and over another line 62 to a node processor interface 64, for loopback of a data packet to the node processor, or host processor (not shown).

The basic function of the receive control state machine 24 is to parse or analyze each incoming data packet received from the MAC interface 20, and to determine how to process that packet. The most important decision to be made in this regard is whether or not an incoming packet needs to be decrypted. Based on its analysis of header information in an incoming packet, the receive control state machine 24 conditions the receive data path to process the incoming packet appropriately. An important aspect of the parsing of incoming data packets is that it must be performed as the packet is streaming in from the MAC interface 20. By the time the first byte of possibly encrypted data arrives, it should be known whether or not decryption is needed.

A similar process is followed for transmitted data packets received from the RMC interface 22. The loopback/transmit control state machine must determine from header information in the transmitted packet whether encryption is required, and must then condition the transmit data path to perform the appropriate transformation and routing of data that follow the header information. The transmit data path handles not only packets that are outbound through the MAC interface 20, but also packets that are being looped back through the cryptographic processor for various reasons. Loopback may be used by the node processor to encrypt a cipher key or keys, prior to encryption of data, or may be used to encrypt or decrypt data and pass the transformed packet back to node processor, either directly or through the RMC interface 22. An important function of loopback processing is in handling false decryptions. A false decryption occurs when an incoming packet is decrypted, but should not have been. Upon discovery of the mistake, the falsely decrypted packet is looped back to the cryptographic processor so that the erroneous transformation of data can be reversed.

The receive data path

The process of parsing an incoming data packet is shown diagrammatically in the flowcharts of FIGS. 4-8. There are a variety of packet formats, corresponding to different network protocols used at higher levels in the hierarchy of network architecture. Parsing of an incoming packet involves the basic steps of identifying the protocol that was used to generate the packet, and extracting sufficient information from the packet headers to determine whether decryption is needed and, if so, what type of decryption and where in the packet it should begin.

Figures 9A, 9B, 10:
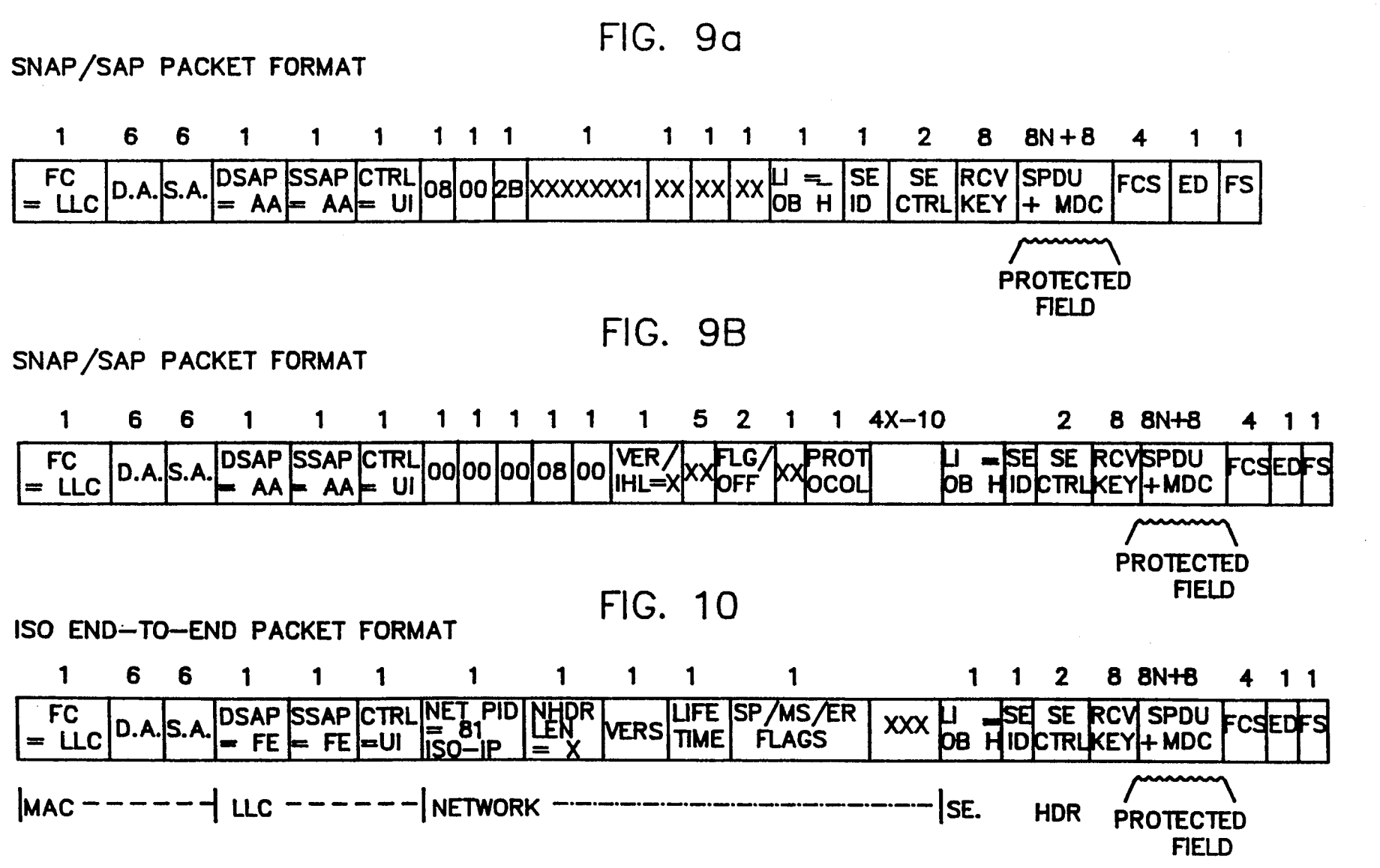
Figure 11:
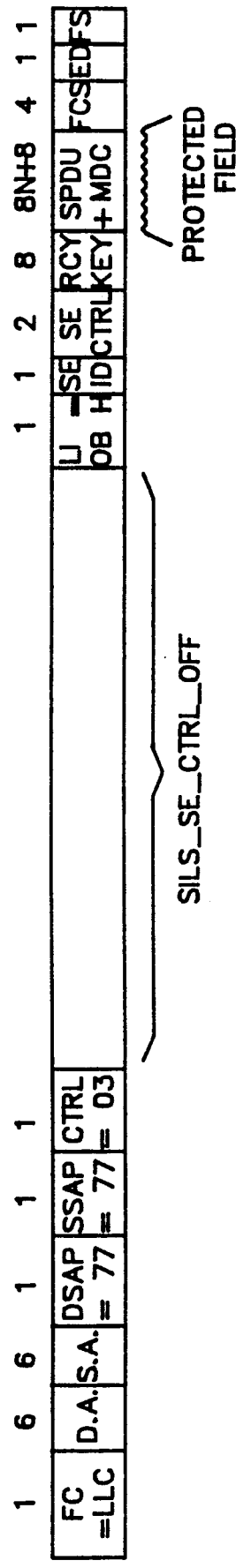
FIG. 11 is a diagram of a packet format applicable to this invention that conforms to a draft 802.1 SILS standard as of Jun. 2, 1990.
Figure 12:
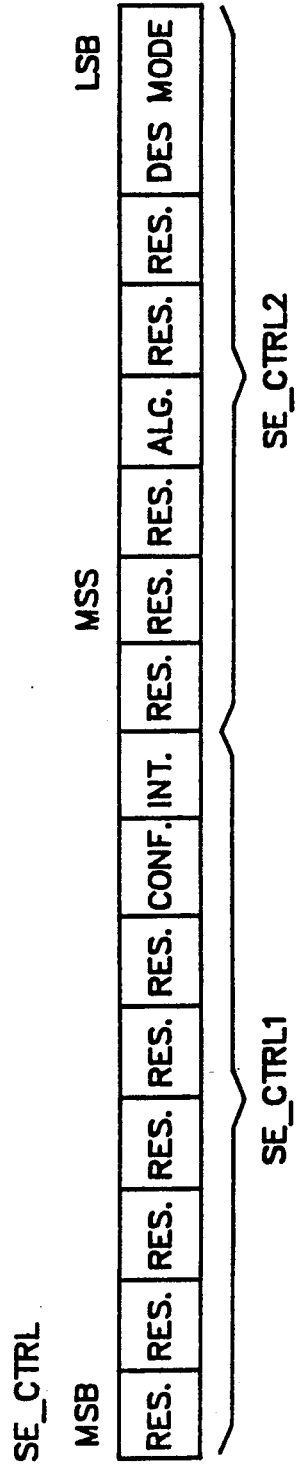
FIG. 12 is a diagram showing in more detail the format of a security control field within the packet formats of FIGS. 9a-9b, 10 and 11.

The identification of every conceivable packet format would be complex and time-consuming. Moreover, the present invention is not limited to parsing logic capable of identifying particular packet formats. By way of example, several types of formats are identified in the receive data path of a presently preferred embodiment of the invention. These formats are shown diagrammatically in FIGS. 9a-9b, 10 and 11. FIGS. 9a-9b show two variants of the packet format known as SNAP/SAP, including a Data Link encryption format defined by Digital Equipment Corporation (FIG. 9a), and the DOD-IP encryption format (FIG. 9b). FIG. 10 shows the ISO end-to-end encryption packet format, and FIG. 11 shows a third format, known as SILS, which is still in the process of being defined in the industry.

All of the packet formats have in common a MAC header, an LLC header, and a security control field (referred to as SE_CTRL). Parsing the incoming packet involves first checking the MAC header to determine if the packet is of the type that should be decrypted, then checking the LLC header to identify the protocol, and finally skipping to the appropriate field of the packet to extract information needed to perform the decryption process. At multiple points in the parsing process, a decision may be made not to decrypt the packet, in which case it is simply forwarded through the RMC interface 22.

Figure 4:
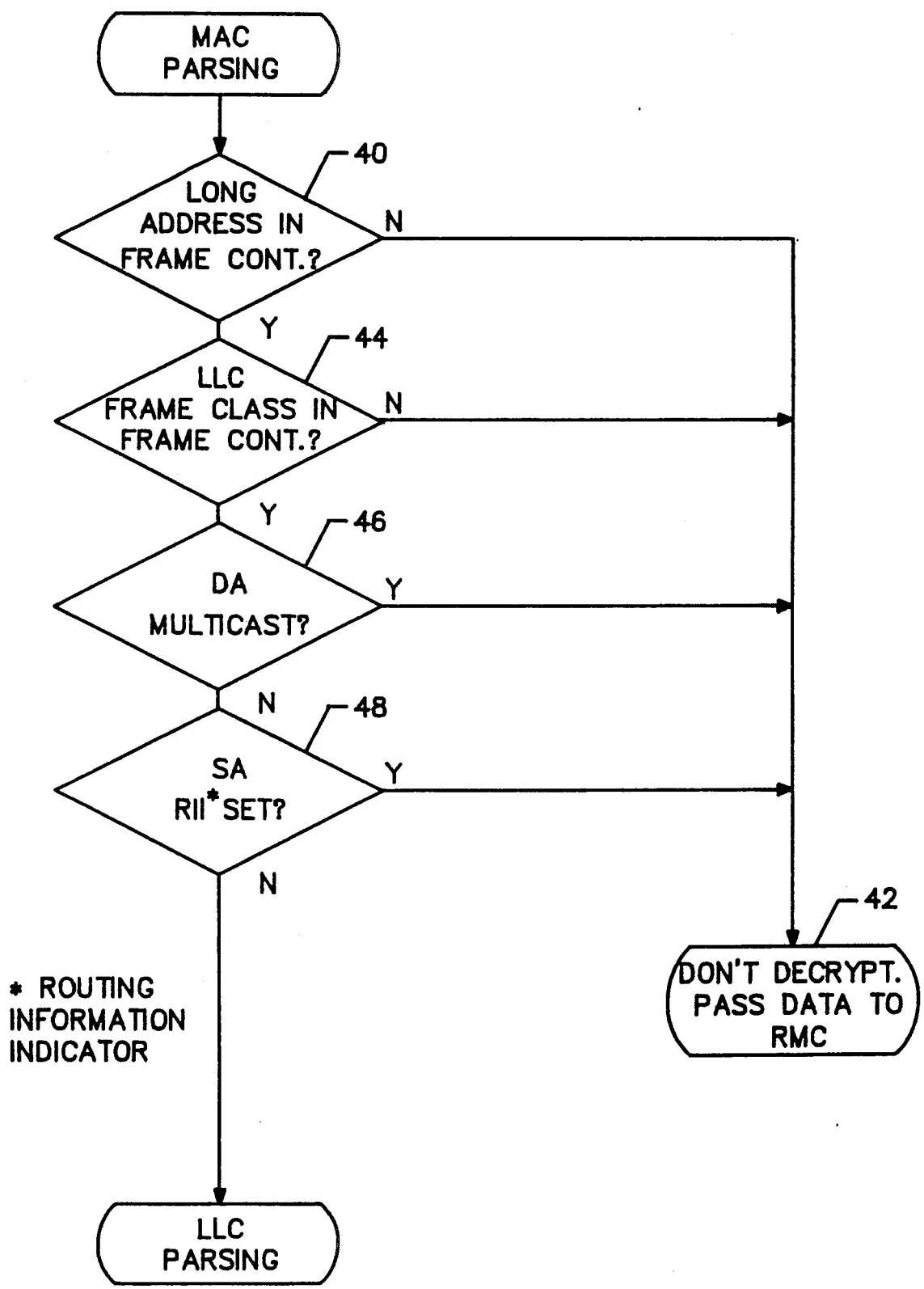
FIGS. 4, 5, 6a, 6b, 7 and 8 are flow charts showing functions performed by the cryptographic processor in parsing a received information packet.
Figure 5:
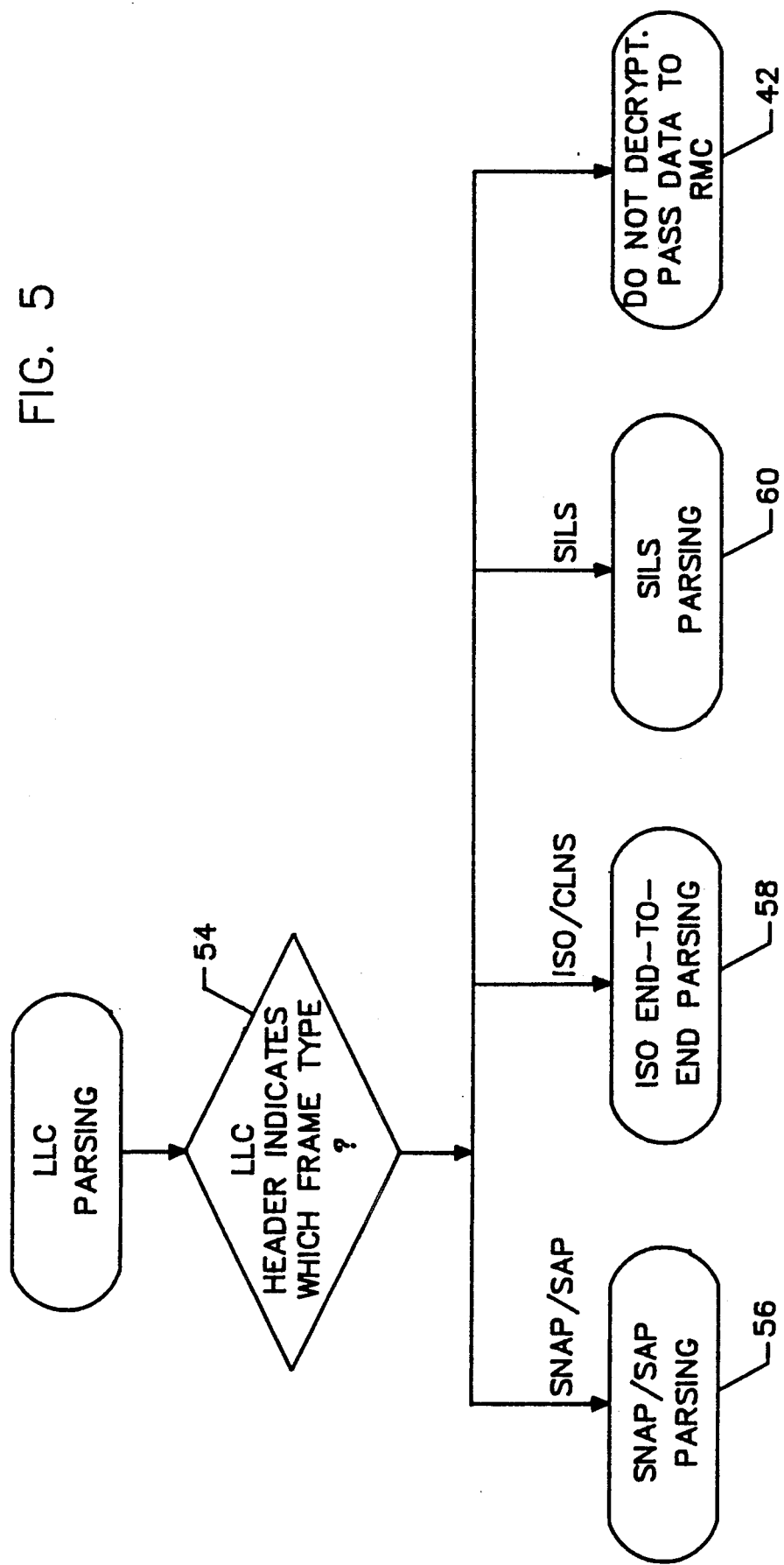

The first step in parsing an incoming packet is to examine the MAC header, as shown in FIG. 4. The frame control field of the MAC header contains a field identifying the packet as using a long address type or a short address type. If long addresses are not specified (as determined in block 40) no decryption is performed and the packet is forwarded to the RMC interface 22 (as indicated in block 42). Similarly, if the frame class identified in the frame control field is not identified as LLC (block 44), no decryption is performed. Further, if either the MAC destination address multicast bit (block 46) or the MAC source address routing information indicator bit (block 48) is set, no decryption is performed.

LLC parsing includes examining the first two bytes of the LLC header to identify the protocol, as indicated in block 54 and the multiple paths emanating from this block. In the case of the SNAP/SAP packet format, the first two bytes of the LLC header will each have a hexadecimal value of AA, i.e. a binary value of 1010 1010. In the case of the ISO end-to-end packet format, the first two bytes of the LLC header will each have a hexadecimal value of FE, i.e. a binary value of 1111 1110. In all cases, the second byte need not necessarily be checked, but the third byte (CONTROL field) has to be 03 hexadecimal (unnumbered information).

If, in parsing the LLC header, the cryptographic processor does not recognize a SNAP/SAP packet (block 56, continued in FIG. 6a), or an ISO end-to-end packet (block 58, continued in FIG. 6b), or a SILS packet (block 60, continued in FIG. 7), then a decision is made not to decrypt (block 42) and the packet is passed to the RMC interface 22 without further cryptographic processing.

What this specification refers to as a SILS packet does not necessarily represent a format that the IEEE 802.10 (SILS) standards committee will eventually agree on as a standard. As will shortly be appreciated, the disclosed embodiment of the present invention is readily adaptable to handle the eventual SILS standard. However, at the time of preparing this specification a firm standard does not exist and any attempt at compliance would be speculative.

In further parsing a SNAP/SAP packet (FIG. 6a), processing continues with a check (in block 62) of the protocol identification (PID) bytes to determine the SNAP/SAP packet type. The packet types recognized in the presently preferred embodiment of the invention are given in the following table:

| Packet Type | PID Byte | | | | | | | | | |
|---|---|---|---|---|---|---|---|---|---|---|
| | 1 | | 2 | | 3 | | 4 | | 5 | |
| Digital Data Link | 0000 | 1000 | 0000 | 0000 | 0010 | 1011 | xxxx | xxx1 | xxxx | xxxx |
| DOD-IP | 0000 | 0000 | 0000 | 0000 | 0000 | 0000 | 0000 | 1000 | 0000 | 0000 |

If the packet type is recognized as being of the Digital Data Link type, the next field to be analyzed is the security control field, as indicated at 64. For a DOD-IP packet type, the IP header length (from the next byte in the packet) is saved for future use as an offset, as indicated in block 66. Then the next five bytes are skipped and a flag/offset field is examined (block 68). The flag/offset field has the following format:

OOOO OOOO OOOO OrDM, where
O is an offset,
r is a reserved bit position,
D means Do not fragment, and M means More fragments.

If there are no more fragments (M=0) and the offset is zero (O=0), as determined in block 70, processing continues. Otherwise, decryption is not performed (block 42). As processing continues, it is next determined (in block 72) whether the protocol identification byte, which follows the flag/offset field by one byte, contains the correct protocol value. The correct protocol identification for the DOD-IP protocol is initially stored in a register (designated the DOD_IP PID register) associated with the cryptographic processor. If the identification is correct, processing continues with SE_CNTRL parsing (64).

Figure 6A:
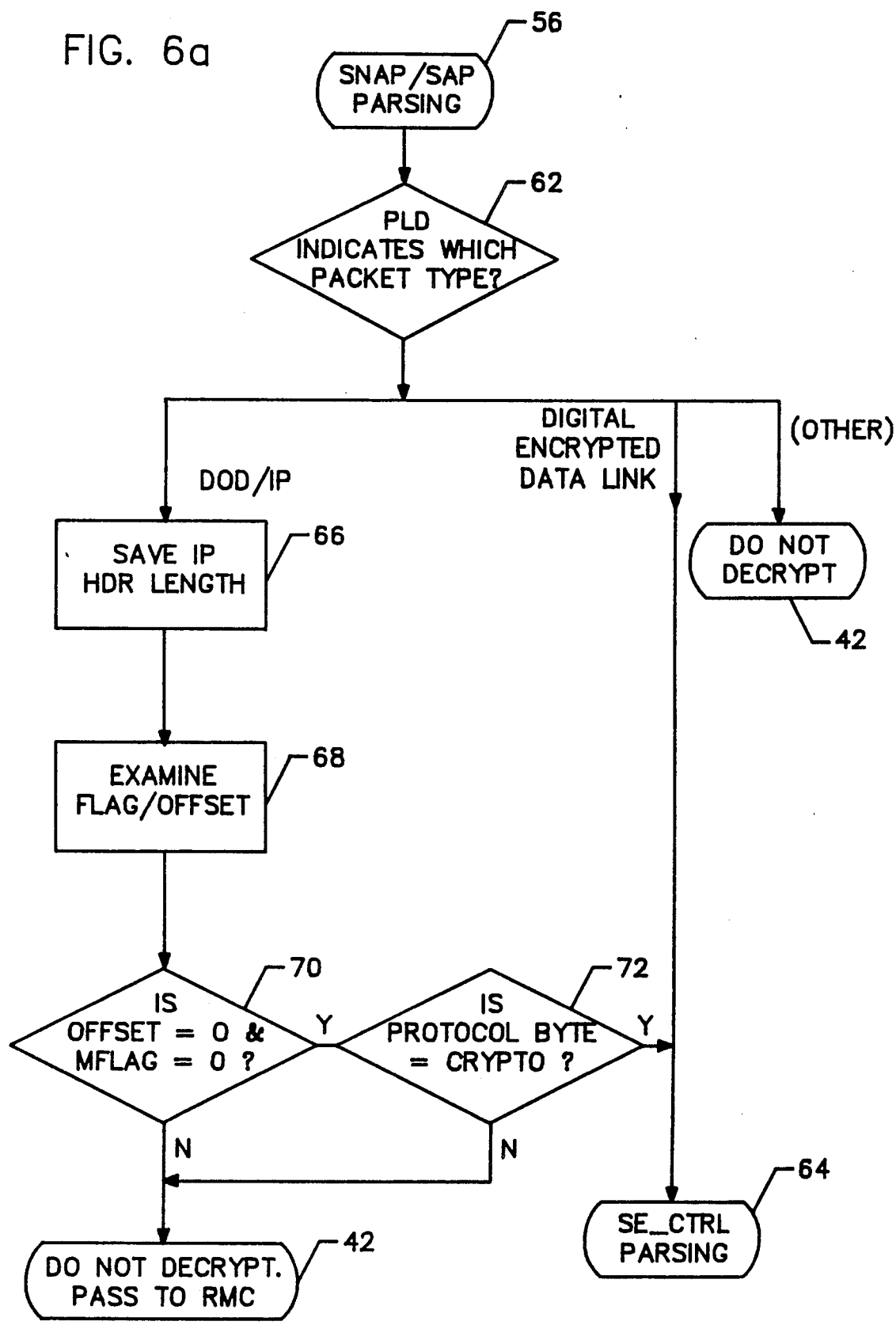
Figure 6B:
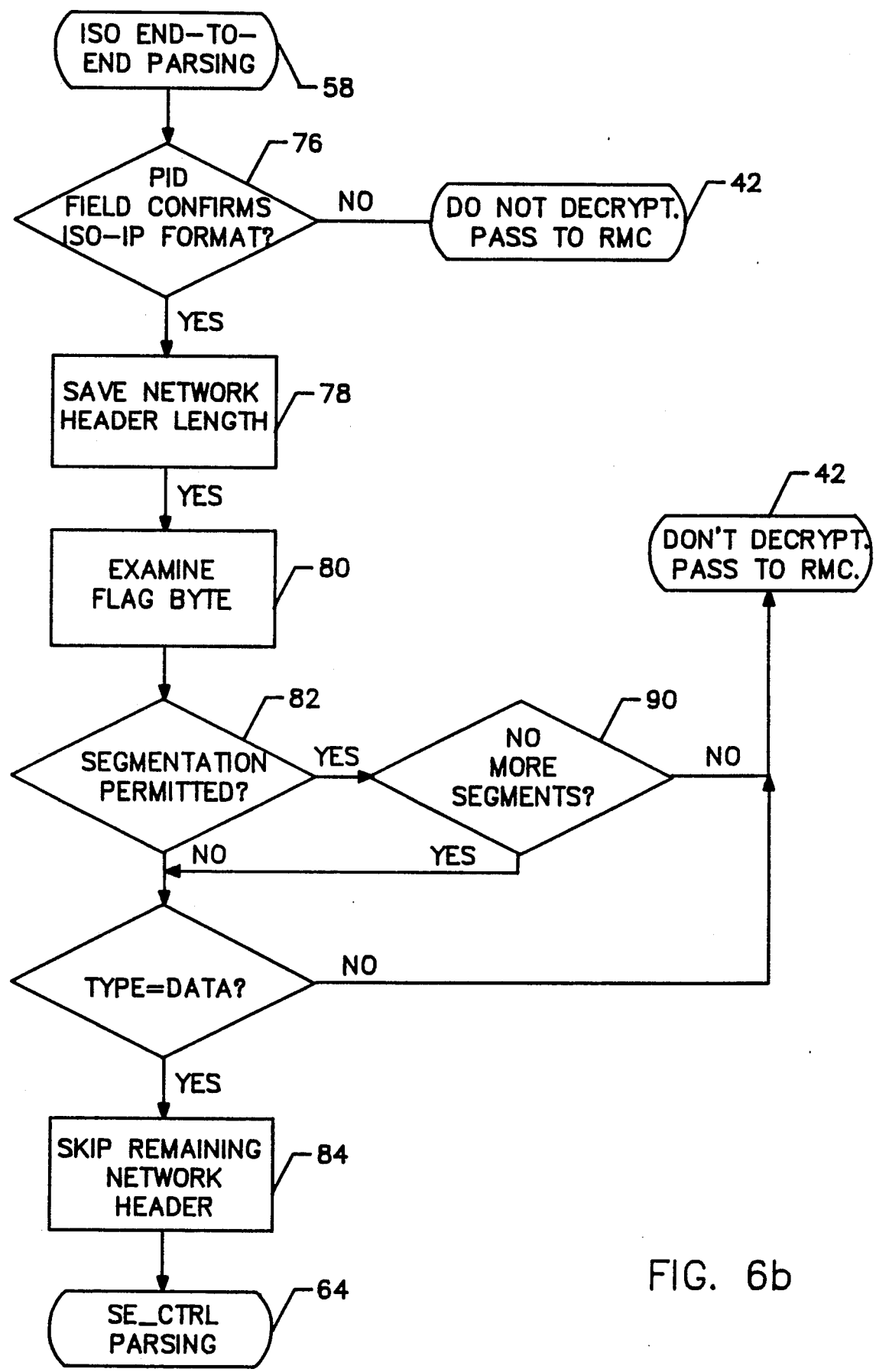
Figure 7:
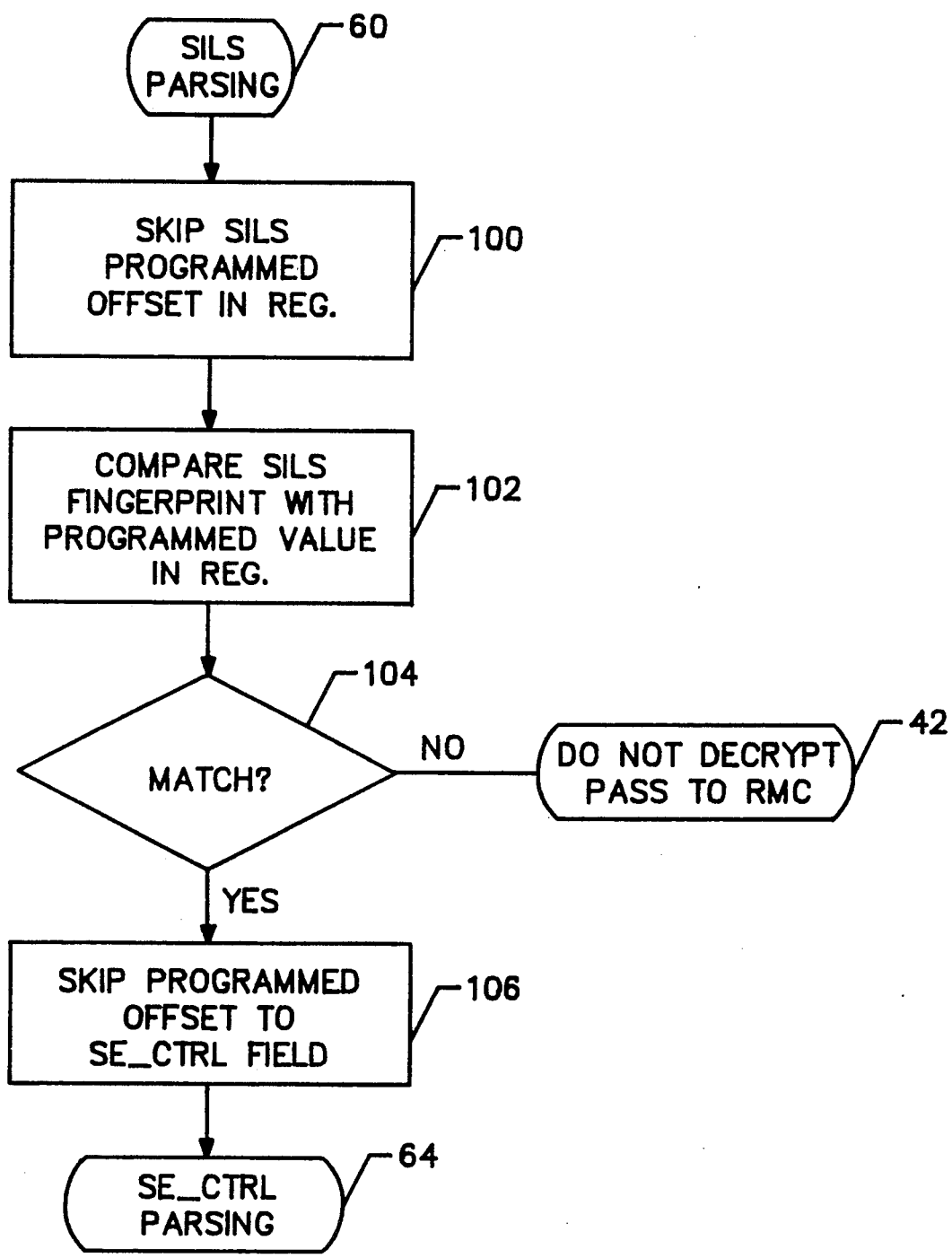

ISO end-to-end parsing, as shown in FIG. 6b, continues with confirmation of the ISO-IP format, by checking the PID field for an expected identifying value (block 76). If confirmation is not found, no decryption is performed (block 42). If an ISO end-to-end packet format is confirmed, the network header length is saved (block 78), and the flag byte is examined (block 80). The flag byte contains the following information:

SMeT TTTT, where
S means Segmentation is permitted,
M means More segments will follow,
e indicates and Error report, and
TTTTT indicates the packet type.

If segmentation is not permitted (S=0), as determined in block 82, decryption may or may not be required. Segmentation could not have occurred so the transport layer header is checked to see if decryption is appropriate. The remaining portion of the network header is skipped (block 84), and a length identification and security identification from the packet are compared (in block 86, FIG. 8) with "fingerprint" values. If there is a fingerprint match (block 88, FIG. 8), cryptographic processing continues with SE_CTRL parsing. If there is no fingerprint match, as determined in block 88, no decryption is performed (block 42).

If segmentation is permitted (S=1), decryption may still be appropriate. If there are no more segments (M=0) and the packet type is 1C (hexadecimal), then the current packet may be the entire unfragmented packet or could be the last fragment (or segment) of a set of segments. The remaining portion of the network header is then skipped (block 84) and security processing will be effected, subject to further checks (block 88). If there are more segments (M=1), then the current packet is a fragment of a larger (possibly encrypted) packet and must not be decrypted.

Parsing for a SILS packet (FIG. 7) is a special case because the SILS format is not yet defined. All that is known with certainty is that a SILS identification code will be transmitted at some designated field of the packet, and that security control field SE_CTRL will begin at another designated location of the packet. Therefore, to test a SILS packet the parsing process first skips (block 100) by a programmed offset number of bytes to a location in the packet where it is known that a SILS identification field will be stored. This field is compared with a programmed SILS fingerprint value (block 102). If there is a match (block 104), processing skips by a programmed offset to the start of the SE_CTRL field (block 106). If there is no match, decryption is not performed (block 42).

Figure 8:
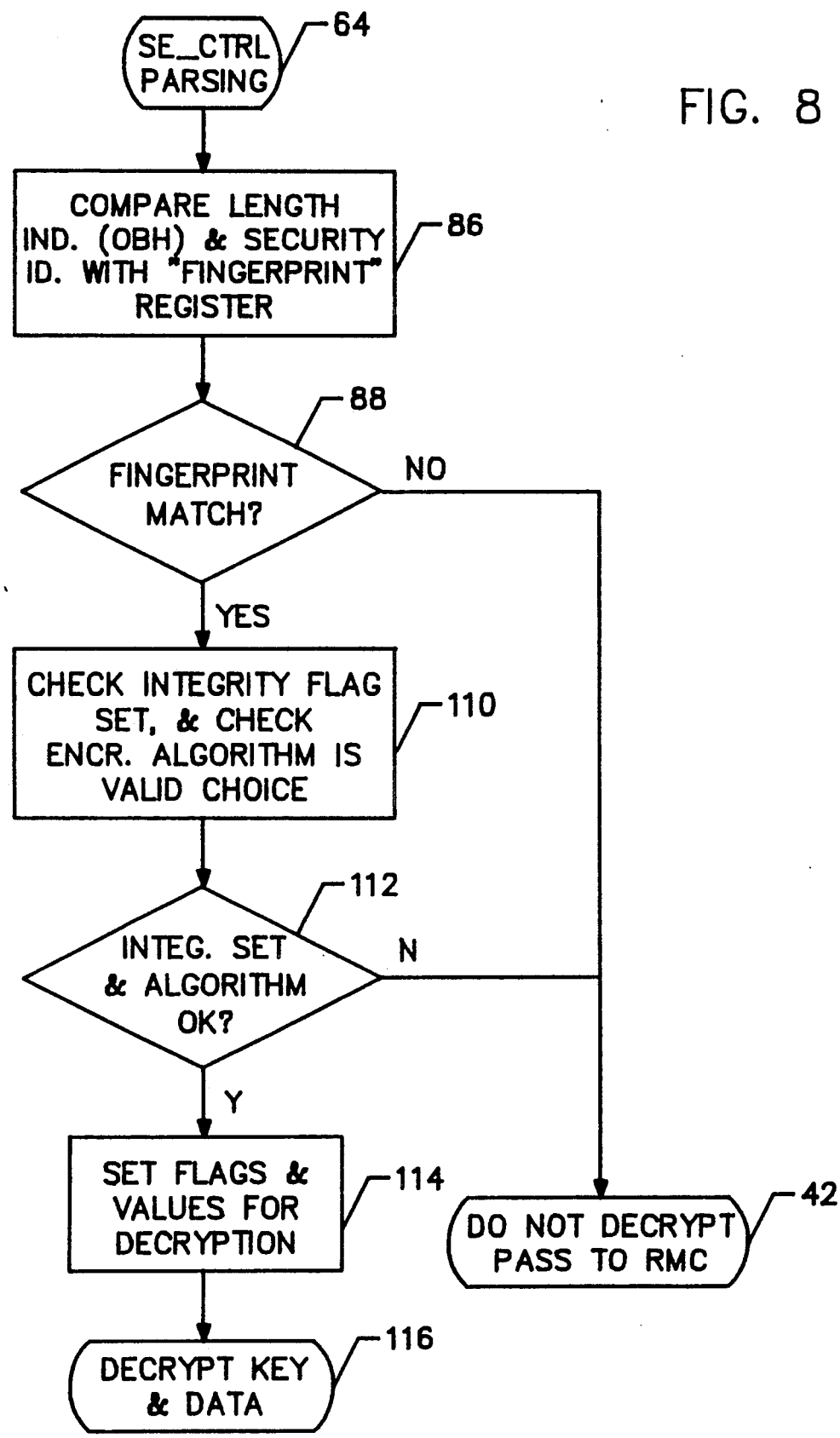

Once the parsing of a received packet has concluded that decryption is required, the parsing process continues with an analysis of the SE_CTRL field of the packet. As shown in FIG. 8, the integrity flag is first checked (block 110) to make sure that cryptographic processing with integrity checking has been selected. If not, or if an unavailable encryption algorithm is selected (block 112), no decryption is performed (block 42). If the test in block 112 is passed, however, appropriate flags are set (block 114) to condition the cryptographic apparatus for decryption, and decryption is initiated (block 116).

The loopback/transmit data path

As discussed earlier with reference to FIG. 3, a packet received from the RMC interface 22 may be either an outbound packet for transmission through the MAC interface 20, with or without encryption, or may be a packet that is not transmitted to the MAC interface, but is instead subject to loopback for further processing by the node processor. Although these alternatives complicate things to some degree, processing in the loopback/transmit data path is made easier by the existence of a cryptographic preamble in those packets for which cryptographic processing is being requested. Details of the cryptographic preamble are discussed in a later descriptive section, but for now it need only be understood that one field of the preamble contains a processing mode field, where the modes are:

000 - outbound transmission,
001 - loopback key encryption,
010 - loopback encryption,
011 - loopback decryption, and
100 - loopback encryption with only ICV returned.

Figure 13A:
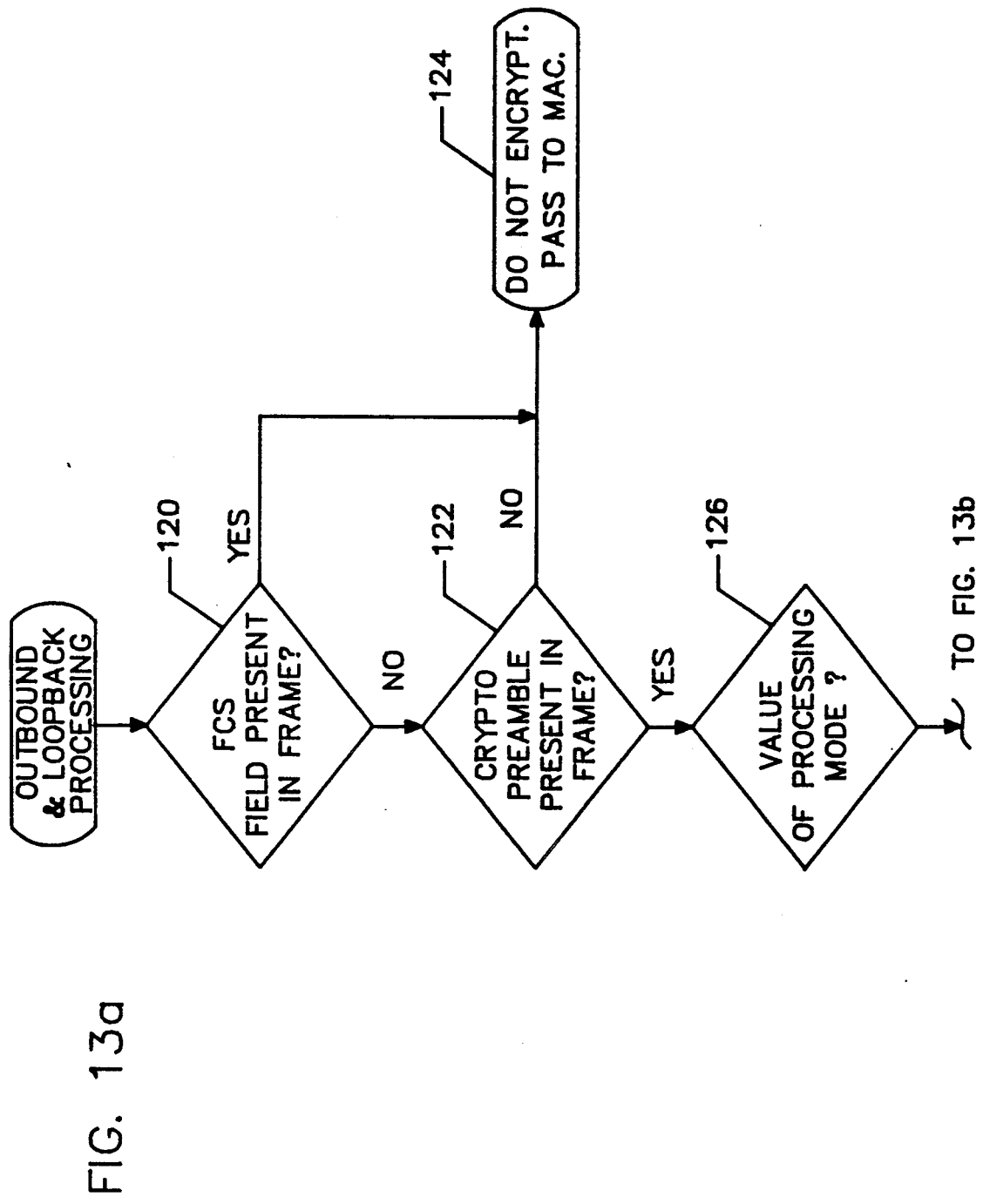
FIGS. 13a and 13b are a flowchart showing functions performed by the cryptographic processor in parsing an outbound or looped back information packet.
Figure 13B:
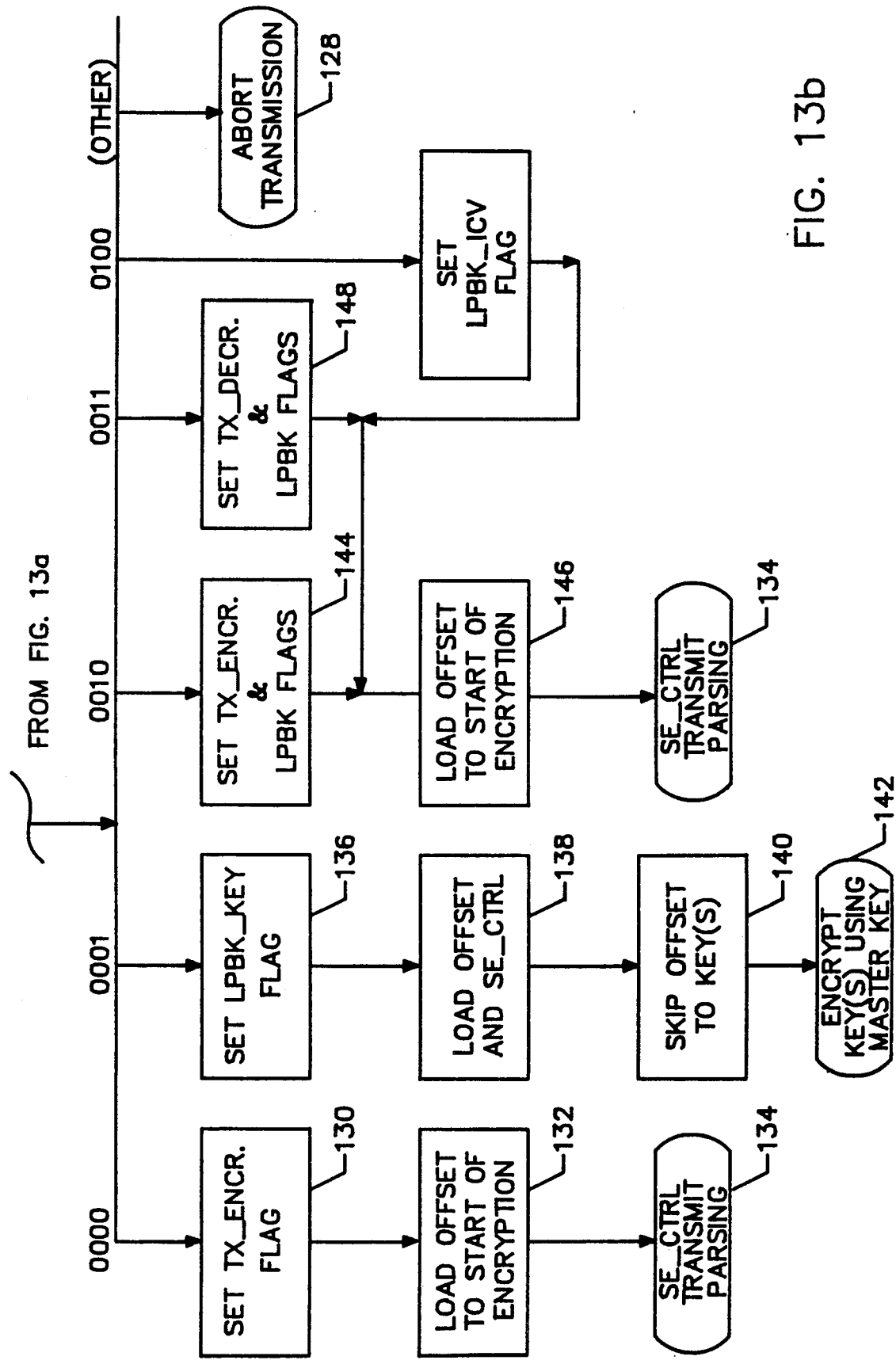
Figure 14A:
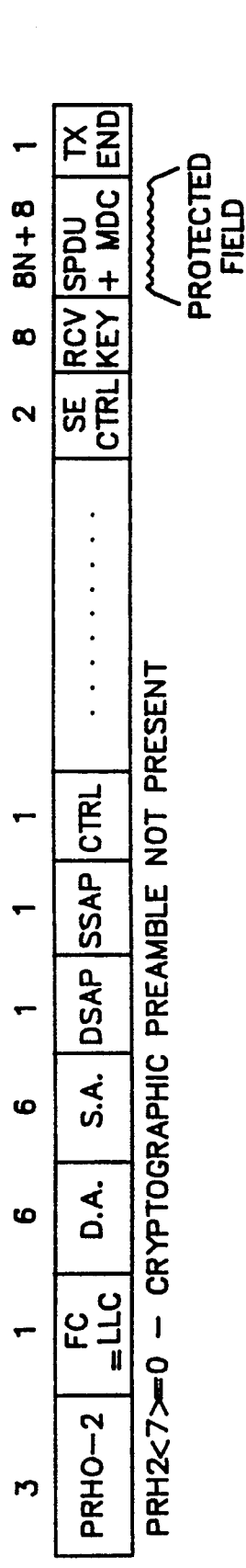
FIGS. 14a-14c are diagrams of three types of outbound or loopback packet formats.
Figure 14B:
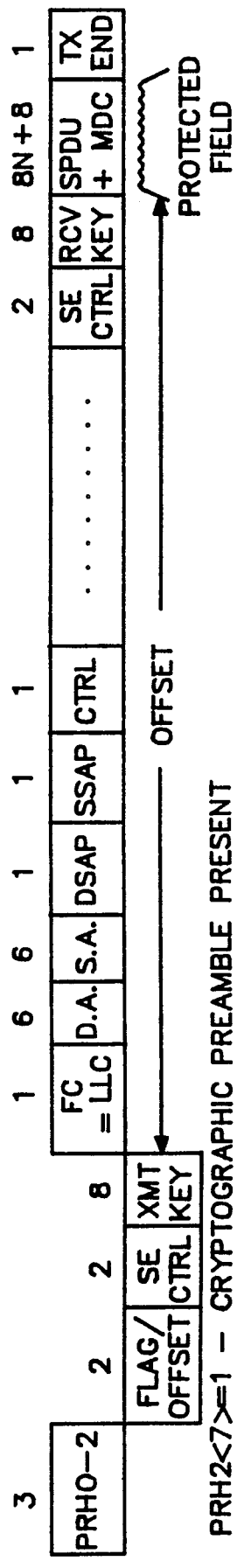
Figure 14C:
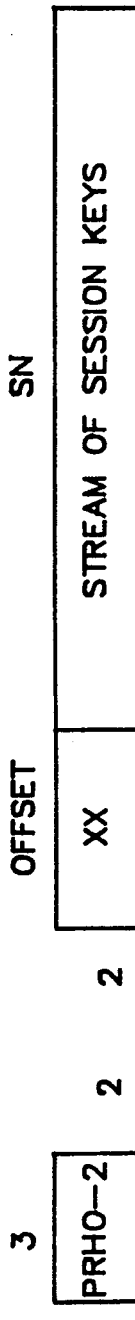

FIG. 13 is a flowchart showing the outbound and loopback processing, and FIGS. 14a-14c are the packet formats for three possible types of packets received from the RMC interface 22. As shown in FIG. 13, the parsing of an outbound or loopback packet begins with two preliminary tests on packet request header bytes at the beginning of the packet. If an FCS field is present in the packet (block 120) or a cryptographic preamble is not present in the packet (block 122), there is no further cryptographic processing, and the packet is forwarded directly to the MAC interface 20, as indicated in block 124. Next, the mode field of the cryptographic preamble is examined (block 126), and a selection is made from alternative processing paths, depending on the mode value in the preamble. If the mode is other than one of the permitted values, the transmission is aborted (block 128).

If the mode value is 00, indicating an outbound encryption, an internal flag is set (TX_ENCR) to indicate this mode is in effect (block 130), an offset is loaded to indicate the starting point of the encryption (block 132), and processing continues with parsing of the SE_CTRL field (block 134). Processing of the SE CTRL field is practically identical with the processing of this field in the receive data path (as shown in FIG. 8). The only differences are that, if the various validity checks are passed, flags and values are set for encryption rather than decryption (block 114), and instead of decrypting the key and data in block 116 there is encrypting of the key and data. Further, if the validity tests are failed, there is a decision to abort packet transmission, rather than a decision not to encrypt.

If the mode value is 01, indicating a loopback key encryption, a flag is set to indicate this (the LPBK—KEY flag), as indicated in block 136, offset and the SE—CTRL field are loaded (block 138), and processing skips packet fields to the encryption key or keys (block 140). In this mode of processing, the keys (as shown in FIG. 14c) are found at an offset distance after the cryptographic preamble. They are encrypted using a previously stored master key (block 142). The cryptographic preamble is looped back with the encrypted keys. The loopback path, either to the node processor interface 64, or to the RMC interface 22, is determined by a mode register that is set to indicate in one of its fields which loopback path is to be taken.

If the mode value is 10, indicating that loopback encryption processing is required, two flags are set to so indicate: a TX—ENCRYPT flag and a LPBK flag, as indicated in block 144. An offset value is loaded to indicate the starting point of the data to be encrypted (block 146), and processing continues with the SE—CTRL transmit parsing (block 134). Data in the packet is subject to the encryption process defined in the SE CTRL field, and the entire packet is looped back along the designated path to the node processor.

If the mode value is 11, indicating that loopback decryption processing is required, the flags set are a TX—DECRYPT flag and the LPBK flag, as indicated in block 148. Processing then continues in block 146, and the loopback process is similar except that the data are subject to decryption instead of encryption.

It will be noted from FIGS. 14a–14c that there are three possible packet formats for information received from the RMC interface 22. The first (FIG. 14a) is that of an outbound packet for which no encryption services are required, as indicated in the packet request header at the beginning of the packet. The second format (FIG. 14b) is that of an outbound or loopback data packet for which encryption services are required. The packet includes a cryptographic preamble, which is used to simplify transmit/loopback processing, is stripped from the packet prior to outbound transmission, but is left with the packet if loopback is called for. The third format (FIG. 14c) is the one used to encrypt a cipher key or keys. Its cryptographic preamble contains a flag/offset field and security control (SE—CTRL) field, but no transmit (XMT) key, since a master key is used to encrypt the keys that follow in the packet. Again, since this is a loopback operation the preamble is returned with the packet.

This concludes an overview of how the cryptographic processor of the invention operates to process packets received from the MAC interface 20 for possible decryption, and packets received from the RMC interface 22 for either encryption and transmission, or for loopback to the node processor after encryption or decryption. In the following subsections, more specific aspects of the invention are further discussed.

Probabilistic Decryption

For various reasons, not all received data packets should be decrypted in the cryptographic processor 16' (FIG. 2). It is possible to determine from the packet headers added at various protocol levels whether the data in the packet must be decrypted. However, a thorough analysis of the headers adds significantly to the complexity of the parsing algorithm and might require that the cryptographic processor maintain a database of protocol identifiers. Moreover, slight changes in header standards would require corresponding changes in the cryptographic processing to determine whether decryption was needed.

To avoid exhaustive header analysis or parsing time, and to minimize the need for continually updating the cryptographic processor, the processor decides whether or not to decrypt on a probabilistic basis, after a less than complete analysis of the packet headers. Basically, checks are made for a limited number of protocol formats, and decryption is either initiated or bypassed as a result of these and other relatively simple tests on the header information. If the decision is made erroneously, either the packet data will be decrypted when it should not have been decrypted, or the packet data will not be decrypted when it should have been decrypted. The falsely decrypted packet is forwarded to the next-higher protocol level and is eventually recognized as being falsely decrypted. The packet is then "looped back" through the cryptographic processor, which reverses the decryption and forwards the data packet back through the RMC interface 22 again.

The loop-back process obviously represents an inefficiency in cryptographic processing, but this is not a significant detriment to the overall process because the probability of such loop-backs is kept to a very low level. In the specific implementation described, and given current protocols, the probability is expected to be of the order of one in $2^{24}$.

One difficulty with this approach is that, as can be seen from the specific packet formats (FIGS. 9–12, the format of an encrypted packet of data not only begins with header information, but ends with a special field referred to as an integrity check value (ICV), depending on the type of encryption required. This field is a specially computed value, analogous to a checksum, that is computed at the encrypting end of the transmission, and is recomputed at the receiving end. Therefore, an encrypted packet will contain the ICV field at the end of the encrypted data, but a non-encrypted packet will not have this field. In the case of a false decryption, the entire packet of data must be recoverable, including the portion erroneously interpreted as the ICV field.

To make the cryptographic processing of the packet entirely reversible, special handling of the ICV is required to assure that no information is lost during a mistaken decryption. The present invention, during decryption, does an exclusive-OR between the computed ICV and the received ICV and places the result in the ICV field of the decrypted packet. Subsequent node processing can check that the ICV field is zero, to verify that the ICV in the encrypted packet was correct.

If the decryption was mistaken, the packet will be looped back through the encryption device. The encryption algorithm is defined to include the steps of computing the ICV value and exclusive-ORing the result with the data present in the ICV field of the cleartext packet. In an outbound packet, that data will always be zero, so the ICV in the transmitted packet will always be the computed ICV. But in a packet which is looped back, that data will be the exclusive-OR of the original data and the computed ICV, so the encryption operation will exactly reverse the mistaken decryption operation.

Handling short blocks in decryption

Cryptographic processing using the data encryption standard (DES) requires that data be presented to the DES processor in blocks of eight bytes each for the preferred mode of this embodiment: cipher block chaining (CBC). Therefore, a transmitted packet that is subject to encryption should contain multiples of eight bytes. At the encryption end of transmission, it is relatively easy to meet this requirement. However, at the decryption end it is not possible to know the length of an incoming packet at the time decryption is started. Since the principal goal of this invention is to provide for real-time encryption and decryption, decryption cannot be delayed until an entire packet of data is received.

There are two situations in which decryption may be started on a packet where the decrypted portion is not a multiple of eight bytes in length. One is a false decryption situation, where decryption is started on the basis of a false probabilistic determination that the incoming packet was encrypted. On reaching the end of the packet, it is then determined that a block of nonstandard size remains to be processed. The other situation is one in which an encrypted message has been segmented by an intermediate router into smaller packets to meet network constraints, and the encrypted portion of the resluting fragments is not a multiple of the block size. A message encrypted for confidentiality and integrity, or for integrity alone, must be decrypted as a single entity, since the message contains at its end an integrity check value (ICV) that is generated from the content of the entire message. Subsequent segmentation of the encrypted message separates the ICV field from some of the encrypted data, and integrity checking cannot be completed until the ICV field is received in the last segment of the message. Therefore, segmented messages should not be decrypted as separate segments, and any attempt to decrypt such a message segment is another form of false decryption.

According to this aspect of the invention, when a nonstandard block size is encountered during decryption, the nonstandard block is forwarded without decryption. The node processor recognizes that a nonstandard block has been received, either by the status of a specific flag for this purpose or by performing length checking on the received blocks of data. The node processor must then take corrective action, using the loopback feature of the cryptographic processor, to transform the entire received packet back to the form in which it was received before false decryption. Initially, then, the falsely decrypted packet is looped back to the cryptographic processor for re-encryption of the entire packet except the last nonstandard block (which was not decrypted). If this re-encrypted packet is one segment of a segmented message, the node processor must combine this re-encrypted segment with others arriving before or after this one, and loop back the entire message as a single entity, for decryption and integrity checking in the cryptographic processor.

It may be observed that this relatively complex use of the loop-back procedure could be avoided if segmented messages could be reliably recognized upon receipt in the cryptographic processor. Unfortunately, processing of each message to include exhaustive segmentation checking would introduce too much complexity to the design and introduce unacceptable dependencies on changes to the protocol standards. The invention instead relies on the use of fast but incomplete segmentation checking, with the probability of non-detection of segmented messages being kept relatively low.

Frame status encoding

In many communication protocols, a status byte is included in the trailing part of the packet, to carry status information specific to the particular protocol. For example, in FDDI the frame status includes an Error Detected bit (E), an Address Recognized bit (A) and a Frame Copied bit (C). Other protocols may need other protocol specific status bits in the frame status byte. In some cases involving pipelined communication architectures, there is a need to convey additional information with the frame, and it is desirable to do so without using any additional frame status bytes, or otherwise reformatting the frame of data. A typical frame status byte has a count field indicating the number of status bits that are included, and a status bit field. For example:

| STATUS BYTE BIT POSITIONS | | | | | | | | # OF PROTOCOL STATUS COUNT |
|---|---|---|---|---|---|---|---|---|
| 7 | 6 | 5 | 4 | 3 | 2 | 1 | 0 | |
| 0 | 0 | 0 | — | — | — | — | — | 0 |
| 0 | 0 | 1 | PS1 | — | — | — | — | 1 |
| 0 | 1 | 0 | PS1 | PS2 | — | — | — | 2 |
| 0 | 1 | 1 | PS1 | PS2 | PS3 | — | — | 3 |
| 1 | 0 | 0 | PS1 | PS2 | PS3 | PS4 | — | 4 |

In this status byte, bits 5–7 contain a count of the number of protocol specific status bits that are contained in bits 4, 3, 2 and 1 of the status byte. As indicated in the table, for example, a count of 1 in bits 5–7 mean that there is a protocol specific status bit PSI in bit position 4. A count of 4 (100) in bits 5–7 indicates that bits 4–1 contain protocol specific status bits PS1, PS2, PS3 and PS4, respectively. In this status byte format, there is room for one additional bit, in bit position 0, which may be used for additional status information. One aspect of the present invention provides a way of storing two bits of additional status information without altering the format of the status byte and without using additional status bytes.

Two additional status bits, obtained in the manner described below, are used in the cryptographic processor of the invention to convey the following meanings to the node processor:

| STATUS BYTE BIT POSITIONS | | | | | | | | # OF PROTOCOL STATUS COUNT |
|---|---|---|---|---|---|---|---|---|
| 7 | 6 | 5 | 4 | 3 | 2 | 1 | 0 | |
| 0 | 0 | 0 | — | — | — | AS1 | AS0 | 0 |
| 0 | 0 | 1 | PS1 | — | — | AS1 | AS0 | 1 |
| 0 | 1 | 0 | PS1 | PS2 | — | AS1 | AS0 | 2 |
| 0 | 1 | 1 | PS1 | PS2 | PS3 | AS1 | AS0 | 3 |
| 1 | 0 | AS1 | PS1 | PS2 | PS3 | PS4 | AS0 | 4 |

AS0 is an additional status bit stored in bit position 0 of the status byte. AS1 is a second additional status bit, which is stored in two bit positions of the status word, depending on the value in the count field (bits 5–7). When the count is less than 4, as indicated by a zero in bit position 7, the AS1 status is stored in bit position 1 of the status byte. But when the count is 4 or greater, as indicated by a 1 in bit position 7, bit 1 is used for the PS4 status and the AS1 status is then stored in bit position 5 of the count, which is not needed when the count is 4.

This revised status byte format provides for the storage of two additional status bits in the frame status byte, without the need for additional status bytes, and with only minimal change in the manner in which the status byte is decoded. For protocol specific status information, the byte is decoded much as before, except that counts between 4 and 7 are all interpreted as indicating the presence of four protocol specific status bits. Decoding of the additional status bits is also relatively simple. Status bit AS0 is always located in bit position 0, and status bit AS1 is located in bit position 1 if the count is 0–3 and is located in bit position 5, or alternatively in bit position 6, if the count is 4–7.

Abort processing in pipelined communication

When cryptographic processing is performed in real time, in series with MAC processing and packet memory processing, there is a "pipeline" of three or more processing modules or devices. In instances where one of the devices aborts processing, a critical question in the operation of the devices is whether the abort condition should be propagated to other adjacent processing devices in the same pipeline. A typical approach is to propagate the abort condition to upstream devices.

In accordance with this aspect of the invention, the abort condition is propagated to an upstream device if, and only if, a packet of data associated with the origin of the abort condition is still being processed by the upstream device. In other words, if the packet being processed by the device that initiated the abort condition has already been completely processed by the upstream device, then there is no point in propagating the abort condition upstream.

Consider, for example, three devices designated device #1, device #2 and device #3, coupled in sequential fashion to process inbound communication packets received by device #1 and passed to devices #2 and #3 in turn. Outbound packets pass from device #3 to device #2 to device #1. During inbound or receive operation, suppose that devices #2 and #3 are processing the same data packet. If device #3 generates an abort condition and transmits it to device #2, device #2 will also abort processing the current packet. But if device #1 is currently processing a different packet, the abort signal will not be passed to device #1.

Figure 15:
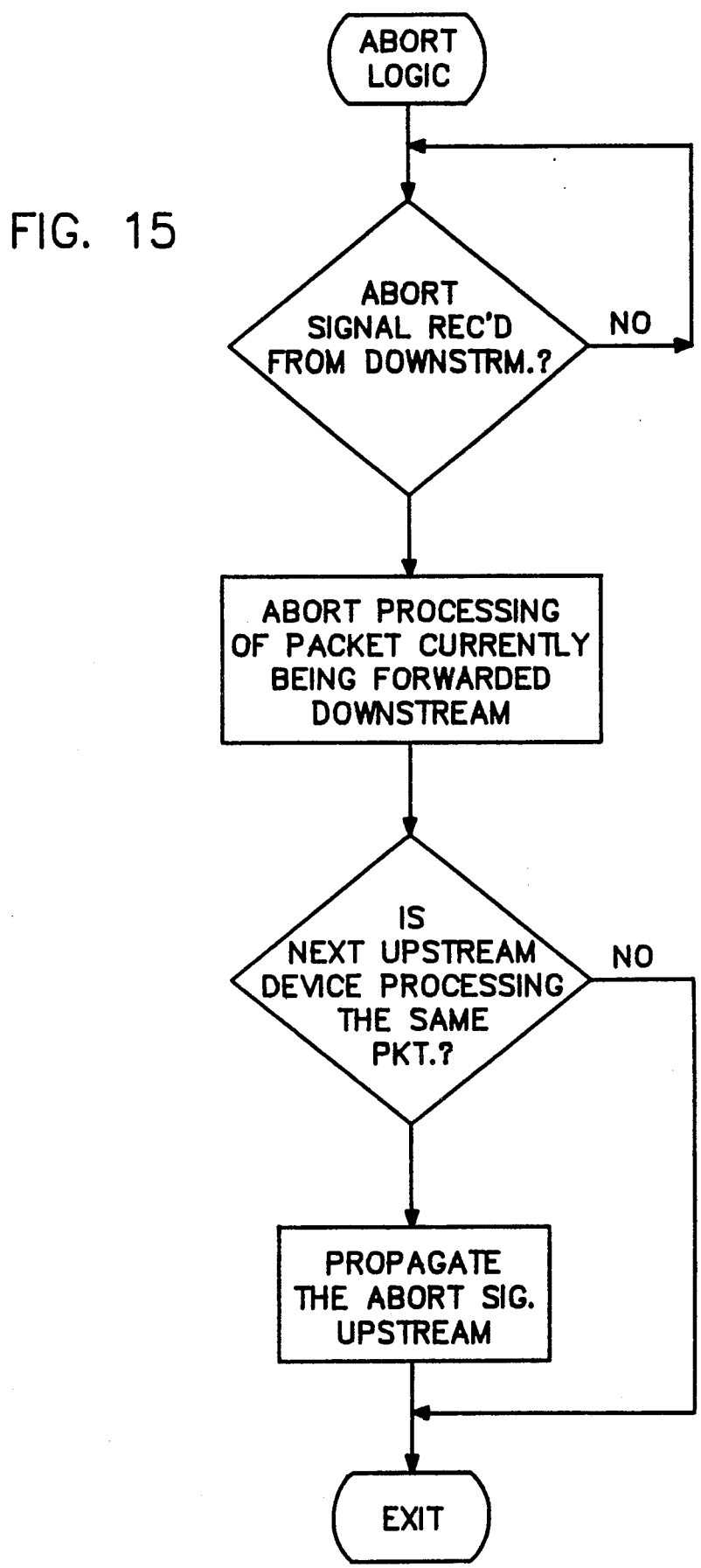
FIG. 15 is a flowchart showing abort processing in accordance with one aspect of the invention.

Abort processing in a device therefore follows these procedural steps, as illustrated in FIG. 15:

1) Has an abort signal been received from the next downstream device? If so go to step 2).

2) Abort processing. Is the next upstream device currently processing the same packet as this device?

3) If, and only if, the answer in step 2) is affirmative, propagate the abort signal to the next upstream device.

This method of handling the propagation of abort conditions improves network performance because it avoids retransmission of data packets that would be aborted unnecessarily without use of the invention.

Encryption mechanism using a cryptographic preamble

As already noted, there are several packet formats for different layers of protocols in network communication. The cryptographic processor faces a significant problem, at both transmitting and receiving ends of a message, in that the portion of a message packet that is to be encrypted or decrypted has to be located. One way to do this would be to provide the cryptographic processor with complete definitions of all of the packet formats that would be encountered. This approach has two major drawbacks. First, the processing time required to analyze the packet formats at each phase of processing would be unacceptably long. Second, such a solution would require continual revision to accommodate new or revised protocol packet formats.

At the receiving or decrypting end of a transmission, this problem has been solved in part by employing a probabilistic approach, wherein the format of an incoming data packet is analyzed quickly but to a limited degree, and decryption is started only if the probability is such that it is needed. False decryptions are handled by a loopback procedure in which a packet decrypted in error is re-encrypted back to the form in which it was received. Another feature of the invention, now to be described, addresses this problem at the sending end of a transmission.

The solution for outward bound message packets is to employ a special cryptographic preamble that is attached to the message packet when encryption is desired. The cryptographic preamble contains encryption key information and an offset (i.e. a pointer) indicating the starting point in the packet at which encryption is to begin. Thus the cryptographic processor can skip intervening header information, regardless of its format and protocol, and begin encryption at the location indicated by the cryptographic header. The header does not affect packet formats transmitted on a network, because it (the cryptographic header) is stripped off the packet prior to transmission.

Basically, this feature of the invention prevents the transmission of falsely encrypted packets onto the network. It also greatly simplifies the implementation of the cryptographic processor, since each packet does not have to be completely parsed or analyzed to find the location of the data to be encrypted.

The cryptographic preamble in a presently preferred embodiment of the invention is in the following format:

| 2 | 2 | 8 (bytes) |
|---|---|---|
| FLAG/OFFSET | SE-CTRL | XMT KEY |

The flag/offset field consists of 4 bits of flag information and a 12-bit offset that indicates the number of bytes to skip before starting the cryptographic operation. The flag bits include a device specific bit that will be zero in most cases, and a three-bit mode field that indicates the type of encryption operation being performed. The mode may be:

0: Outbound encryption (not a loopback);
1: Loopback KEY encryption;
2: Loopback encryption;
3: Loopback decryption;
4: Loopback ICV only.

The SE-CTRL field defines the type of cryptographic process, and has fields to indicate confidentiality encryption, integrity encryption, the type of cryptographic algorithm (DES or other), the specific cryptographic algorithm mode used (such as ECB, CFB or CBC), and the size of the cyclic redundancy code (CRC) to be used. The transmit key is an 8-byte field that defines the cryptographic key used for encryption.

The cryptographic preamble contains all the information needed to locate the data that is to be encrypted and to determine the type of encryption that is required, regardless of the packet format that is used by various protocols. Use of the cryptographic preamble prevents the transmission of falsely encrypted packets onto the network. In addition, the presence of the preamble simplifies the hardware needed for encryption, since the entire packet does not need to be parsed.

Use of programmable resisters to facilitate decryption

In the cryptographic processing of received packets, the basic information needed includes the location of the decrypted data within the packet, and control for the decryption to be performed, such as the decryption key and the mode of encryption. The cryptographic preamble discussed above is not available at the receiving end of a transmission, since it is stripped prior to transmission onto the network.

This situation is complicated by the fact that standards relating to cryptography in networks are still developing. Yet there is an immediate need for cryptographic hardware. A packet encrypted at the datalink layer will necessarily contain a field of information that identifies the packets as one that requires cryptographic processing. However, for at least one developing protocol (SILS) the location of this identifying field within the packet is not yet fixed with certainty. Another uncertainty is the location of the start of the encrypted data in the packet.

To overcome these problems, one feature of the present invention provides that the cryptographic processor includes three programmable registers, containing: (a) an offset from the beginning of the datalink header (or from the beginning of the MAC header) to a field that contains the cryptographic identifier, (b) the value of the identifier that should be present to identify the packet as requiring cryptographic processing for a particular protocol, and (c) an offset value indicative of the beginning of the encrypted data (the offset being with respect to the identifier field to some other point of reference in the packet).

The three hardware registers are initialized with offset and identifier values needed to satisfy an anticipated standard for encryption, but may be conveniently changed as necessary if the standard is revised. Thus the cryptographic hardware is readily adaptable to a variety of encryption standards.

Cryptographic processing in the integrity-only mode

In integrity-only encryption, a packet of data is transmitted in plaintext, i.e. without encryption, but an integrity check value (ICV) is included in the transmitted packet to ensure the integrity or authenticity of the data. When such a packet is the subject of a loopback procedure, the plaintext data will be unnecessarily looped back. In accordance with this feature of the invention, only the ICV field and the headers preceding the data will be looped back in integrity-only loopback procedures. This reduces the amount of data that is looped back and improves system performance.

The mechanism used to implement this feature is the cryptographic preamble, which is generated for any outward bound packet of looped back packet. The cryptographic preamble contains a status field, one possible value of which indicates that the packet is for integrity-only encryption and for loopback. This involves a slight modification to the outbound and loopback processing flowchart of FIG. 13. In addition to the four types of operations described with reference to this figure, a fifth mode value (0100) is also valid, and has the meaning that integrity-only loopback encryption is called for. When this mode value is present in the preamble, the cryptographic processor is conditioned to loop back only the headers and the ICV value. The data field is used only to compute the ICV value to loop back, but is not itself looped back to the node processor.

Encryption with selective disclosure of protocol identifiers

At the datalink layer level, a header is added to each message packet and contains fields normally referred to as DSAP (destination service access point) and SSAP (source service access point) addresses. These ordered pairs at the beginning of the logic link layer PDU (protocol data unit) identify an LLC (logical link control) "client" of the network. The DSAP/SSAP pair is followed immediately by a control field whose contents are interpreted by the LLC sublayer. If the frame is an unnumbered information frame, it contains user data that is passed up to the LLC client. If not, it is a control frame that is processed inside the LLC sublayer. The control field value is 03 hexadecimal for unnumbered information.

If the DSAP and SSAP fields contain a special value of AA (hexadecimal), this identifies a subnetwork protocol, generally known as a SNAP/SAP protocol. In this case, the five bytes following the control field are redefined as a protocol identifier (PID) field, as indicated below:

| 1 byte | 1 byte | 1 byte | 5 bytes |
| --- | --- | --- | --- |
| DSAP = AA | SSAP = AA | CTRL = 03 | PID |

The PID contains three bytes of unique organizational identifier (OUI), which is unique to a particular company or other organization, followed by two bytes for protocol information assigned by that organization. Since these headers are in the plaintext region of each information packet, they are accessible by network monitors to monitor all network activities. There are three cases of interest in which problems are posed in datalink layer encryption. In one case, a network user may not wish to reveal the encryption protocol used in encrypting a packet. The other two cases involve a converse problem, where the user may want to reveal the encryption protocol but may not be able to do so. This situation may arise when one uses the datalink encryption standard as defined by the Standard for Interoperable LAN Security (SILS), an ongoing effort of an IEEE 802.10 subcommittee aimed at standardizing datalink layer encryption for networks.

Some network users who do not wish to make this protocol information available to others may deliberately falsify the DSAP/SSAP and PID fields in their encrypted messages. When this happens, to any significant degree, statistical information gathered by network monitors is distorted and unreliable, at least as to the communication protocols being employed.

This problem is avoided in the present invention by assigning a special SNAP/SAP protocol identifier to signify that the real protocol is to remain hidden or anonymous. More specifically, a special value of one of the PID bytes is used to signify anonymity of the PID. Although network monitors still cannot determine the true protocols being employed in those packets carrying the special SNAP/SAP PID value, the packets can at least be categorized as using an anonymous or unknown communication communication protocol, rather than being mistakenly recognized as using a real protocol.

The converse situation arises when a network user would prefer to disclose the encryption protocol being executed, but is prevented from doing so because the message has to be encapsulated to indicate encryption. In the case of SILS, which is not yet completely defined, it appears that there will be a reserved value of DSAP or SSAP for the purpose of identifying a packet encrypted in the datalink layer.

There are two categories of information packets for which the user might want to disclose the encryption protocol. One is that of an original frame addressed to a SNAP/SAP, and the other is that of an original frame that is addressed to a SAP other than a SNAP/SAP.

For the case of a SNAP/SAP frame in which the protocol is to be disclosed, the original protocol is stored in the last two bytes of the PID field. (It will be recalled that the first three bytes of the PID field are the OUI, which uniquely identifies the subnetwork organization.) For an encrypted frame, a selected bit in the last two bytes of the PID field is set to a "1", or a selected combination of bits in the same two bytes is set to a preselected value. The selected bit or combination of bits must not be already used in defining the protocol. For example, the least significant bit of the next to last byte of the PID field could be used to indicate encryption. Whenever the last two bytes of the PID field has the value xxxx xxx1 xxxx xxxx, this would indicate that the frame was encrypted. If the value is xxxx xxx0 xxxx xxxx, this indicates no encryption. The bit used for this purpose would have to be one that was not used to define a protocol. In this example, therefore, protocol identifiers having an odd number in the second hexadecimal position of the two-byte field could not be used. Since the PID field is completely under the control of the subnet organization, it is not difficult to define a bit or combination of bits that does not conflict with the possible values of protocol identifier.

The third case of interest also arises when a network user wishes to reveal the protocol and would be prevented from doing so by the SILS datalink encryption standard, but the original frame is addressed to a non-SNAP/SAP destination. This case is handled by first encapsulating the non-SNAP/SAP frame with an additional plaintext header of the SNAP/SAP type. As previously discussed, this header has a PID field of which the first three bytes are a unique organization identifier and the last two bytes may be used for protocol identification. This case requires the use of another special code as one of the last two bytes in the PID field. For example, the last two bytes may be 1000_0011 orig_sap. The byte containing 1000_0011 is a special code (83) indicating that the next following byte "orig_sap" contains the original SAP for the encapsulated frame. In general, any predefined subfield could be used to contain the special code and any other predefined subfield could be used to contain the original SAP.

From the foregoing, it will be appreciated that the invention provides the flexibility to disclose the underlying protocol if desired, or to keep the protocol hidden without distortion of network statistics. Such flexibility for selective disclosure of the protocol can be of great importance in security and network management.

It will be understood that the foregoing description includes, by way of illustration, details of implementation that are specific to a particular network architecture, namely FDDI. Those skilled in the network communications art will also understand that the principles described may be readily adapted for use with other network architectures, with possibly different interfaces and frame formats. For example, the invention may be readily adapted for use in an Ethernet network architecture. Further, although the cryptography processing described above is best implemented in an "on-board" processor that is integrated physically with other conventional network processing components, the principles of the invention still apply when the cryptographic processing is performed by an "off-board" processor or device added to a conventional network processor or node that did not previously have cryptographic capability.

It will be appreciated from the foregoing that the present invention represents a significant advance in the field of cryptographic processing in the network environment. In particular, the invention ensures that information packets can be processed and decrypted, if necessary, at network speeds. This result is achieved principally because of the use of a probabilistic approach in the analysis of the incoming information packets, with loopback processing being available for correction of false decryptions, and provision being made to handle nonstandard block sizes presented for decryption. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A method for cryptographically processing information packets received over a communication network, some of which may include encrypted data, the method comprising the steps of:
    examining an incoming information packet as it is received in the form of a serial stream of information from a first in-line processing stage;
    determining to an acceptable level of probability whether the incoming information packet contains encrypted data and whether it should be decrypted;
    if it is determined that the packet should be decrypted, finding the starting position of encrypted data in the incoming packet, and decrypting the encrypted data; and
    passing the information packet, whether decrypted or not, to a second in-line processing stage.

2. A method as defined in claim 1, wherein:
    the step of determining whether the incoming packet contains encrypted data includes identifying the packet format from knowledge of a limited number of packet formats that are generated by a corresponding number of network protocols; and
    if the packet format is identified, the step of finding the starting position of the encrypted data includes obtaining an offset value indicative of the starting position.

3. A method as defined in claim 2, and further comprising:
    subsequently determining in or after the second in-line processing stage that an information packet that was decrypted should not have been;

passing the decrypted packet back from the second in-line processing stage for further cryptographic processing; and re-encrypting the information packet to regenerate cleartext data that should not have been subjected to decryption.

4. A method as defined in claim 3, wherein:

the step of decrypting is performed in such a manner that it is completely reversible in the re-encrypting step.

5. A method as defined in claim 4, wherein:

n bytes of cleartext integrity check value in the packet are recovered on decryption by exclusive ORing the last n bytes in the received packet with an n-byte integrity check value generated from the preceding data bytes, where n is an integer that depends on the specific cryptographic approach used; and in the event of a false decryption, the previously mentioned exclusive ORing step results in the generation of false data, but the re-encrypting step includes exclusive ORing the false data with the integrity check value, to regenerate the real cleartext data in the last n bytes of the packet.

6. A method as defined in claim 2, wherein:

the step of determining whether the incoming packet contains encrypted data and whether it should be decrypted, includes determining to an acceptable level of probability whether the packet is part of a message that has been segmented into multiple packets, and electing not to decrypt such a message segment.

7. A method as defined in claim 6, and further comprising:

passing each message segment on to the second in-line processing stage, without decryption, for further processing;

reforming, in the second or a later in-line processing stage, the message segments into a complete message; and returning the complete message, if encrypted, back from the second in-line processing stage for decryption.

8. A method as defined in claim 6, and further comprising:

passing each message segment on to the second in-line processing stage, without decryption, for further processing;

if any segment is falsely decrypted, looping back the falsely decrypted segment for re-encryption;

reforming, in the second or a later in-line processing stage, the message segments into a complete message; and returning the complete message, if encrypted, back from the second in-line processing stage for decryption.

9. A cryptographic processor for use in a communications network, the processor comprising:

data encryption/decryption means;

first and second interface circuits connected between the data encryption/decryption means and two in-line processing stages in a network architecture;

wherein the cryptographic processor is insertable between the two in-line processing stages without modification to any existing network protocols.

and wherein the encryption/decryption means includes means for examining an incoming information packet as it is received in the form of a serial stream of information from the first in-line processing stage, means for determining to an acceptable level of probability whether the incoming information packet contains encrypted data and whether it should be decrypted, means that operate if it is determined that the packet should be decrypted, for finding the starting position of encrypted data in the incoming packet and decrypting the encrypted data, and means for passing the information packet, whether decrypted or not, to the second inline processing stage.

10. A cryptographic processor as defined in claim 9, wherein:

the means for determining whether the incoming packet contains encrypted data includes means for identifying the packet format from knowledge of a limited number of packet formats that are generated by a corresponding number of network protocols; and if the packet format is identified, the means for finding the starting position of the encrypted data includes means for obtaining an offset value indicative of the starting position.

11. A cryptographic processor as defined in claim 10, and further comprising:

means for subsequently determining in or after the second in-line processing stage that an information packet that was decrypted should not have been;

means for passing the decrypted packet back from the second in-line processing stage for further cryptographic processing; and means within the encryption/decryption means, for re-encrypting the information packet to regenerate cleartext data that should not have been subjected to decryption.

12. A cryptographic processor as defined in claim 11, wherein:

the encryption/decryption means performs decryption in such a manner that it is completely reversible in the means for re-encrypting.

13. A cryptographic processor as defined in claim 12, wherein:

the encryption/decryption means includes means for recovering, on decryption, n bytes of cleartext integrity check value in the packet by exclusive ORing the last n bytes in the received packet with an n-byte integrity check value generated from the preceding data bytes, where n is an integer that depends on the specific cryptographic approach used; and in the event of a false decryption, the previously mentioned exclusive ORing operation of the encryption/decryption means results in the generation of false data, but the means for re-encrypting includes means for exclusive ORing the false data with the integrity check value, to regenerate the real cleartext data in the last n bytes of the packet.

14. A cryptographic processor as defined in claim 10, wherein:

the means for determining whether the incoming packet contains encrypted data and whether it should be decrypted, includes means for determining to an acceptable level of probability whether the packet is part of a message that has been segmented into multiple packets, and electing not to decrypt such a message segment.

15. A cryptographic processor as defined in claim 14, wherein the encryption/decryption means further comprises:
   means for passing each message segment on to the second in-line processing stage, without decryption, for further processing and reforming of the message segments into a complete message; and
   means for processing the complete message if returned from the second in-line processing stage for decryption.

16. A cryptographic processor as defined in claim 9, wherein:
   the encryption/decryption means includes means for performing encryption/decryption in accordane with a selected data encryption standard.

17. A cryptographic processor as defined in claim 16, wherein:
   the selected encryption standard is DES (data encryption standard.

18. A method for cryptographically processing information packets received over a communication network, some of which may include encrypted data, the method comprising the steps of:
   examining an incoming information packet as it is received in the form of a serial stream of information from a first in-line processing stage;
   determining to an acceptable level of probability whether the incoming information packet contains encrypted data and whether it should be decrypted;
   if it is determined that the packet should be decrypted, finding the starting position of encrypted data in the incoming packet;
   temporarily storing encrypted data until a fixed-size block has been accumulated for further processing;
   initiating decryption of the accumulated fixed-size block;
   continuing to store incoming data to form subsequent blocks for decryption;
   bypassing decryption of a last block in the packet in the event that there are not enough data elements remaining in the packet to form a complete fixed-size block.

19. A method as defined in claim 18, and further comprising the steps of:
   re-encrypting all blocks of the received packet except the last, incomplete block; and
   concatenating the re-encrypted blocks with the incomplete block, to regenerate the packet data in the form in which it was received, before decryption.

20. A method as defined in claim 18, and further comprising the steps of:
   determining whether the reformed packet is part of a segmented message;
   if the reformed packet is part of a segmented message, temporarily storing the reformed packet until all other portions of the segmented message have been received;
   concatenating all segments of the segmented message; and
   decrypting the message as a single entity.

* * * * *